US008060825B2

(12) United States Patent  (10) Patent No.: US 8,060,825 B2
Chaudhri  (45) Date of Patent: Nov. 15, 2011

(54) CREATING DIGITAL ARTWORK BASED ON CONTENT FILE METADATA

(75) Inventor: Imran Chaudhri, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 818 days.

(21) Appl. No.: 11/960,674

(22) Filed: Dec. 19, 2007

(65) Prior Publication Data

US 2008/0168365 A1    Jul. 10, 2008

Related U.S. Application Data

(60) Provisional application No. 60/937,993, filed on Jun. 29, 2007, provisional application No. 60/879,469, filed on Jan. 8, 2007, provisional application No. 60/879,253, filed on Jan. 7, 2007, provisional application No. 60/883,818, filed on Jan. 7, 2007.

(51) Int. Cl.
*G06F 13/00* (2006.01)
*G06F 15/00* (2006.01)
(52) U.S. Cl. ........................ 715/719; 715/723
(58) Field of Classification Search .......... 715/707–710, 715/715, 763–765, 851–853, 719–723
See application file for complete search history.

(56) References Cited

U.S. PATENT DOCUMENTS

| 2002/0048224 | A1* | 4/2002 | Dygert et al. | 369/1 |
| 2003/0182139 | A1* | 9/2003 | Harris et al. | 705/1 |
| 2004/0155888 | A1* | 8/2004 | Padgitt et al. | 345/619 |
| 2005/0097135 | A1  | 5/2005 | Epperson et al. | 707/104.1 |
| 2006/0236847 | A1* | 10/2006 | Withop | 84/612 |

FOREIGN PATENT DOCUMENTS

| WO | WO 2005/031608 A2 | 4/2005 |
| WO | WO 2006/130234 A1 | 12/2006 |

OTHER PUBLICATIONS

Apple Education, "Creating Content for iPod + iTunes," 2006, 9 pages.
International Search Report and Written Opinion for International Application PCT/US2007/088914, mailed Jun. 23, 2008.

* cited by examiner

*Primary Examiner* — Cao "Kevin" Nguyen
(74) *Attorney, Agent, or Firm* — Morgan, Lewis & Bockius LLP

(57) ABSTRACT

A computer-implemented method is disclosed. The method applies to a set of content files including a subset of the content files that do not have associated digital artwork. For each content file in the set of content files, whether the content file has associated digital artwork is determined. For each content file in the set of content files that does not have associated digital artwork, digital artwork for the content file is created based on metadata associated with the content file. The digital artwork for a plurality of content files in the set of content files is displayed.

28 Claims, 20 Drawing Sheets

CREATING DIGITAL ARTWORK BASED ON CONTENT FILE METADATA

RELATED APPLICATIONS

This application claims priority to U.S. Provisional Patent Application Nos. 60/937,993, "Portable Multifunction Device," filed Jun. 29, 2007; 60/879,469, "Portable Multifunction Device," filed Jan. 8, 2007; 60/879,253, "Portable Multifunction Device," filed Jan. 7, 2007; and 60/883,818, "Creating Digital Artwork Based on Content File Metadata," filed Jan. 7, 2007. All of these applications are incorporated by reference herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; (10) U.S. patent application Ser. No. 11/367,749, "Multi-Functional Hand-Held Device," filed Mar. 3, 2006; and (11) U.S. Provisional Patent Application No. 60/824,769, "Portable Multifunction Device," filed Sep. 6, 2006. All of these applications are incorporated by reference herein in their entirety.

TECHNICAL FIELD

The disclosed embodiments relate generally to digital artwork, and more particularly, to creating digital artwork for a content file based on metadata associated with the file.

BACKGROUND

As portable electronic devices become more compact, and the number of functions performed by a given device increases, it has become a significant challenge to design a user interface that allows users to easily interact with a multifunction device. This challenge is particularly significant for handheld portable devices, which have much smaller screens than desktop or laptop computers. This situation is unfortunate because the user interface is the gateway through which users receive not only content but also responses to user actions or behaviors, including user attempts to access a device's features, tools, and functions. Some portable communication devices (e.g., mobile telephones, sometimes called mobile phones, cell phones, cellular telephones, and the like) have resorted to adding more pushbuttons, increasing the density of push buttons, overloading the functions of pushbuttons, or using complex menu systems to allow a user to access, store and manipulate data. These conventional user interfaces often result in complicated key sequences and menu hierarchies that must be memorized by the user.

Many conventional user interfaces, such as those that include physical pushbuttons, are also inflexible. This is unfortunate because it may prevent a user interface from being configured and/or adapted by either an application running on the portable device or by users. When coupled with the time consuming requirement to memorize multiple key sequences and menu hierarchies, and the difficulty in activating a desired pushbutton, such inflexibility is frustrating to most users.

As a result of the small size of display screens on portable electronic devices, it can be difficult for users to read lists of content files. Therefore, it is desirable to display digital artwork associated with content files. Displaying digital artwork associated with content files provides a user-friendly way of identifying content files even on non-portable devices. However, digital artwork associated with content files is not always available.

Accordingly, there is a need for a system and method of creating digital artwork for content files and displaying the created digital artwork in user interfaces that allow users to identify and/or access the corresponding content files easily.

SUMMARY

The above deficiencies and other problems associated with user interfaces for displaying and accessing content files are reduced or eliminated by the disclosed device. In some embodiments, the device has a touch-sensitive display (also known as a "touch screen") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. In some embodiments, the functions may include telephoning, video conferencing, e-mailing, instant messaging, blogging, digital photographing, digital videoing, web browsing, digital music playing, and/or digital video playing. Instructions for performing these functions may be included in a computer program product configured for execution by one or more processors.

A computer-implemented method is disclosed. The method applies to a set of content files including a subset of the content files that do not have associated digital artwork. For each content file in the set of content files, whether the content file has associated digital artwork is determined. For each content file in the set of content files that does not have associated digital artwork, digital artwork for the content file is created based on metadata associated with the content file. The digital artwork for a plurality of content files in the set of content files is displayed.

A computer-implemented method is disclosed. Whether a content file has associated digital artwork is determined. If the content file does not have associated digital artwork, digital artwork for the content file is created based on metadata associated with the content file. The created digital artwork is displayed.

A graphical user interface on a computer is disclosed. The graphical user interface comprises one or more pieces of digital artwork, corresponding to one or more content files, displayed on a computer screen. For a respective piece of digital artwork, if a content file has an associated digital artwork, the respective piece of digital artwork displayed on the computer screen is the associated digital artwork. If a content file does not have an associated digital artwork, the respective piece of digital artwork displayed on the computer screen comprises digital artwork created based on metadata associated with the content file.

A computer is disclosed, comprising a display, one or more processors, memory, and one or more programs. The one or more programs are stored in the memory and configured to be executed by the one or more processors. The one or more programs include instructions for determining if a content file has associated digital artwork and instructions for creating digital artwork for the content file based on metadata associated with the content file, if the content file does not have associated digital artwork. The one or more programs also include instructions for displaying the created digital artwork.

A computer readable storage medium storing one or more programs is disclosed. The one or more programs include instructions, which when executed by a computer, cause the computer to determine if a content file has associated digital artwork. If the content file does not have associated digital artwork, the instructions cause the computer to create digital artwork for the content file based on metadata associated with the content file and to display the created digital artwork.

A computer with a display is disclosed. The computer comprises means for determining if a content file has associated digital artwork and means for creating digital artwork for the content file based on metadata associated with the content file, if the content file does not have associated digital artwork. The computer also comprises means for displaying the created digital artwork.

The disclosed embodiments allow digital artwork corresponding to a content file to be created when no digital artwork associated with the content file is available. The created digital artwork provides a user-friendly way to identify and/or access the corresponding content file.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
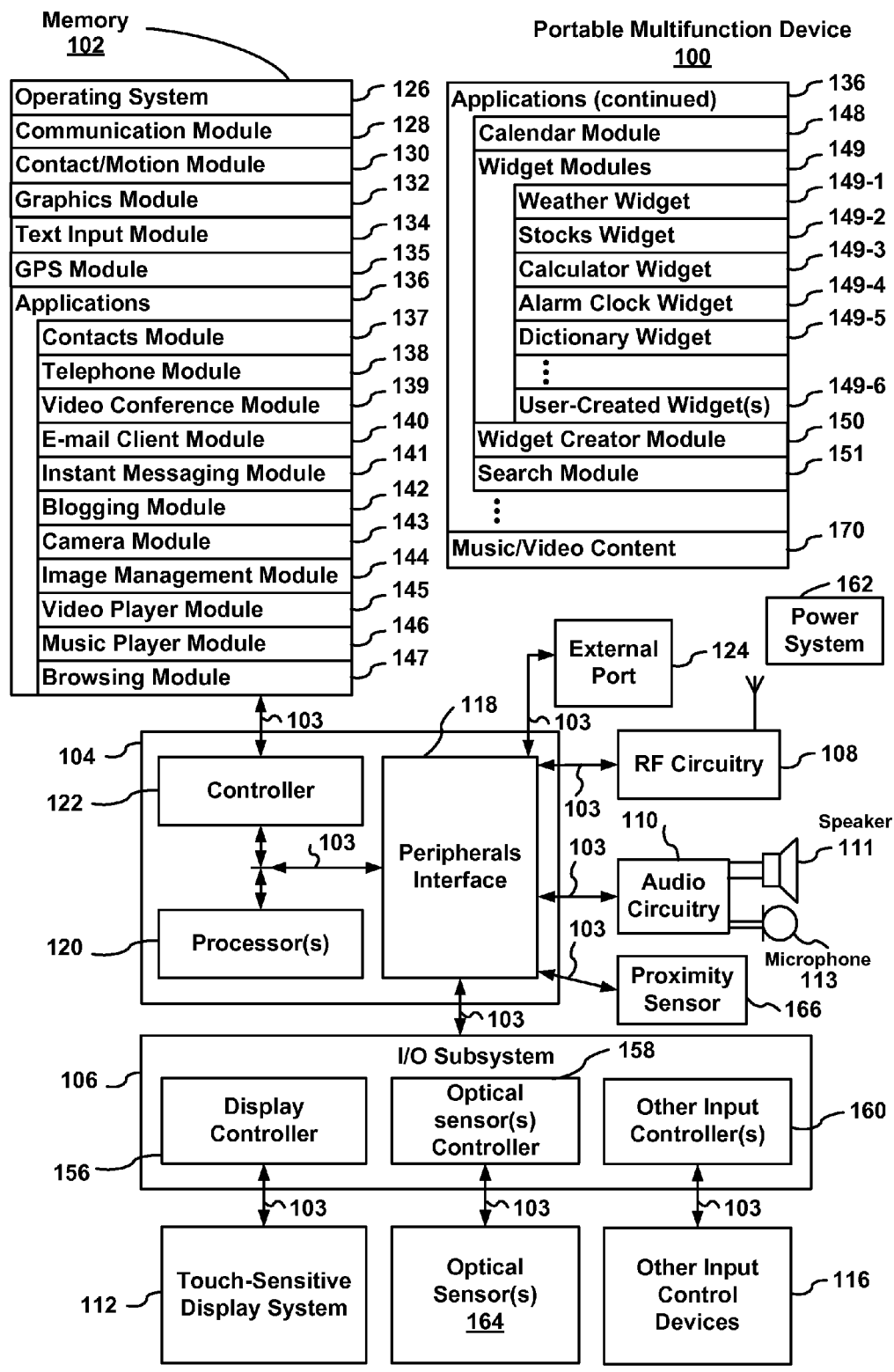
FIG. 1 is a block diagram illustrating a portable multifunction device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

Embodiments of a portable multifunction device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a user-interface device that may provide navigation commands based on an angular displacement of the wheel or a point of contact with the wheel by a user of the device. A click wheel may also be used to provide a user command corresponding to selection of one or more items, for example, when the user of the device presses down on at least a portion of the wheel or the center of the wheel. Alternatively, breaking contact with a click wheel image on a touch screen surface may indicate a user command corresponding to selection. For simplicity, in the discussion that follows, a portable multifunction device that includes a touch screen is used as an exemplary embodiment. It should be understood, however, that some of the user interfaces and associated processes may be applied to other devices, such as personal computers and laptop computers, that may include one or more other physical user-interface devices, such as a physical click wheel, a physical keyboard, a mouse and/or a joystick.

The device supports a variety of applications, such as a telephone application, a video conferencing application, an e-mail application, an instant messaging application, a blogging application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006 and Ser. No. 11/459,615, "Touch Screen Keyboards For Portable Electronic Devices," filed Jul. 24, 2006, the contents of which are hereby incorporated by reference in their entirety. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable multifunction device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable multifunction device 100, and that the device 100 may have more or fewer components than shown, may combine two or more components, or a may have a different configuration or arrangement of the components. The various components shown in FIG. 1 may be implemented in hardware, software or a combination of both hardware and software, including one or more signal processing and/or application specific integrated circuits.

Memory 102 includes one or more memory devices, each of which comprises, or a plurality of which collectively comprise a computer readable storage medium. Memory 102 may include high-speed random access memory and may also include non-volatile memory, such as one or more magnetic disk storage devices, optical disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen 112 displays visual output from the portable device 100, whereas touch sensitive tablets do not provide visual output. The touch screen 112 may have a resolution in excess of 100 dpi. In an exemplary embodiment, the touch screen in the display system has a resolution of approximately 168 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein in their entirety.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multi-function device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. Nos. 11/241,839, "Proximity Detector In Handheld Device," filed Sep. 30, 2005, and Ser. No. 11/240,788, "Proximity Detector In Handheld Device," filed Sep. 30, 2005, which are hereby incorporated by reference in their entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel 116.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like. An animation in this context is a display of a sequence of images that gives the appearance of movement, and informs the user of an action that has been performed (such as moving an email message to a folder). In this context, a respective animation that confirms an action by the user of the device typically takes a predefined, finite amount of time, typically between 0.2 and 1.0 seconds, and generally less than two seconds.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone module 138 for use in location-based dialing, to camera module 143 and/or blogging module 142 as picture/video metadata, and to applications that provide location-based services such as weather widgets, local yellow page widgets, and map/navigation widgets).

The applications 136 may include the following modules (or sets of instructions), or a subset or superset thereof:

a contacts module 137 (sometimes called an address book or contact list);
a telephone module 138;
a video conferencing module 139;
an e-mail client module 140;
an instant messaging (IM) module 141;
a blogging module 142;
a camera module 143 for still and/or video images;
an image management module 144;
a video player module 145 (for playing video content in content files 170);
a music player module 146 (for playing music content in content files 170);
a browser module 147;
a calendar module 148;
widget modules 149, which may include weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6; and/or
search module 151.

Examples of other applications 136 that may be stored in memory 102 include memo pad and other word processing applications, JAVA-enabled applications, encryption, digital rights management, voice recognition, and voice replication.

In conjunction with touch screen 112, display controller 156, contact module 130, graphics module 132, and text input module 134, the contacts module 137 may be used to manage an address book or contact list, including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, the telephone module 138 may be used to enter a sequence of characters corresponding to a telephone number, access one or more telephone numbers in the address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, the video-conferencing module 139 may be used to initiate, conduct, and terminate a video conference between a user and one or more other participants.

In conjunction with RF circuitry 108, touch screen 112, display controller 156, contact module 130, graphics module 132, and text input module 134, the e-mail client module 140 may be used to create, send, receive, and manage e-mail. In conjunction with image management module 144, the e-mail module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 may be used to enter a sequence of characters corresponding to an instant message, to modify previously entered characters, to transmit a respective instant message (for example, using a Short Message Service (SMS) or Multimedia Message Service (MMS) protocol), to receive instant messages and to view received instant messages. In some embodiments, transmitted and/or received instant messages may include graphics, photos, audio files, video files and/or other attachments as are supported in a MMS and/or an Enhanced Messaging Service (EMS).

In conjunction with RF circuitry 108, touch screen 112, display controller 156, contact module 130, graphics module 132, text input module 134, image management module 144, and browsing module 147, the blogging module 142 may be used to send text, still images, video, and/or other graphics to a blog (e.g., the user's blog).

In conjunction with touch screen 112, display controller 156, optical sensor(s) 164, optical sensor controller 158, contact module 130, graphics module 132, and image management module 144, the camera module 143 may be used to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images.

In conjunction with touch screen 112, display controller 156, contact module 130, graphics module 132, audio circuitry 110, and speaker 111, the video player module 145 may be used to display, present or otherwise play back videos (e.g., on the touch screen or on an external, connected display via external port 124). Embodiments of user interfaces and associated processes using video player module 145 are described further below.

In conjunction with touch screen 112, display system controller 156, contact module 130, graphics module 132, audio circuitry 110, speaker 111, RF circuitry 108, and browser module 147, the music player module 146 allows the user to download and play back recorded music and other sound files (represented by content 170 in FIG. 1) stored in one or more file formats, such as MP3 or AAC files. In some embodiments, the device 100 may include the functionality of an MP3 player, such as an iPod (trademark of Apple Computer, Inc.). Embodiments of user interfaces and associated processes using music player module 146 are described further below.

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail module 140, and browser module 147, the calendar module 148 may be used to create, display, modify, and store calendars and data associated with calendars (e.g., calendar entries, to do lists, etc.).

In conjunction with RF circuitry 108, touch screen 112, display system controller 156, contact module 130, graphics module 132, text input module 134, and browser module 147, the widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, the search module 151 may be used to search for text, music, sound, image, video, and/or other files in memory 102 that match one or more search criteria (e.g., one or more user-specified search terms).

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
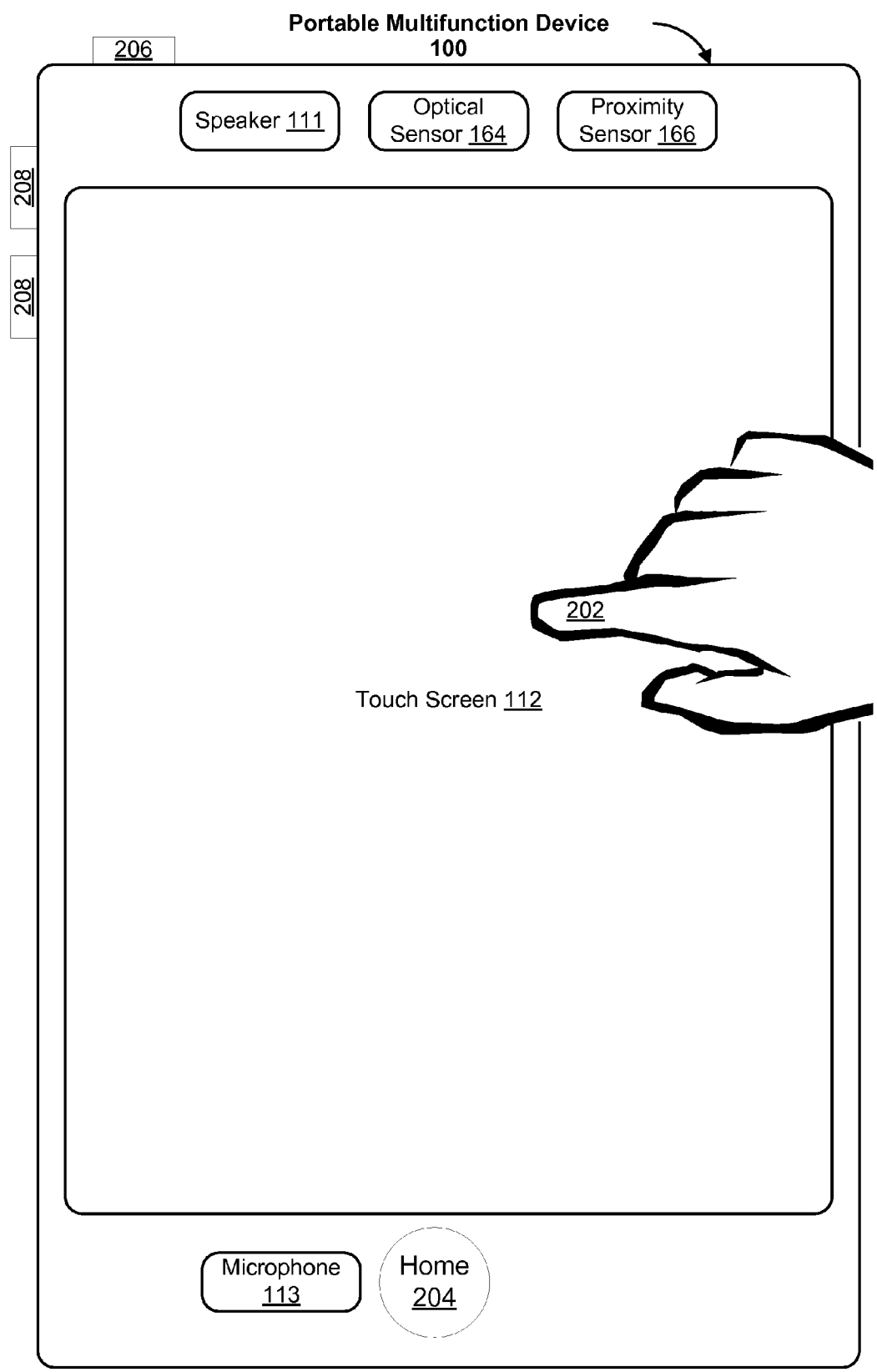
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with the device 100. In some embodiments, inadvertent contact with a graphic may not select the graphic. For example, a swipe gesture that sweeps over an application icon may not select the corresponding application when the gesture corresponding to selection is a tap.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable multifunction device 100.

Figure 3:
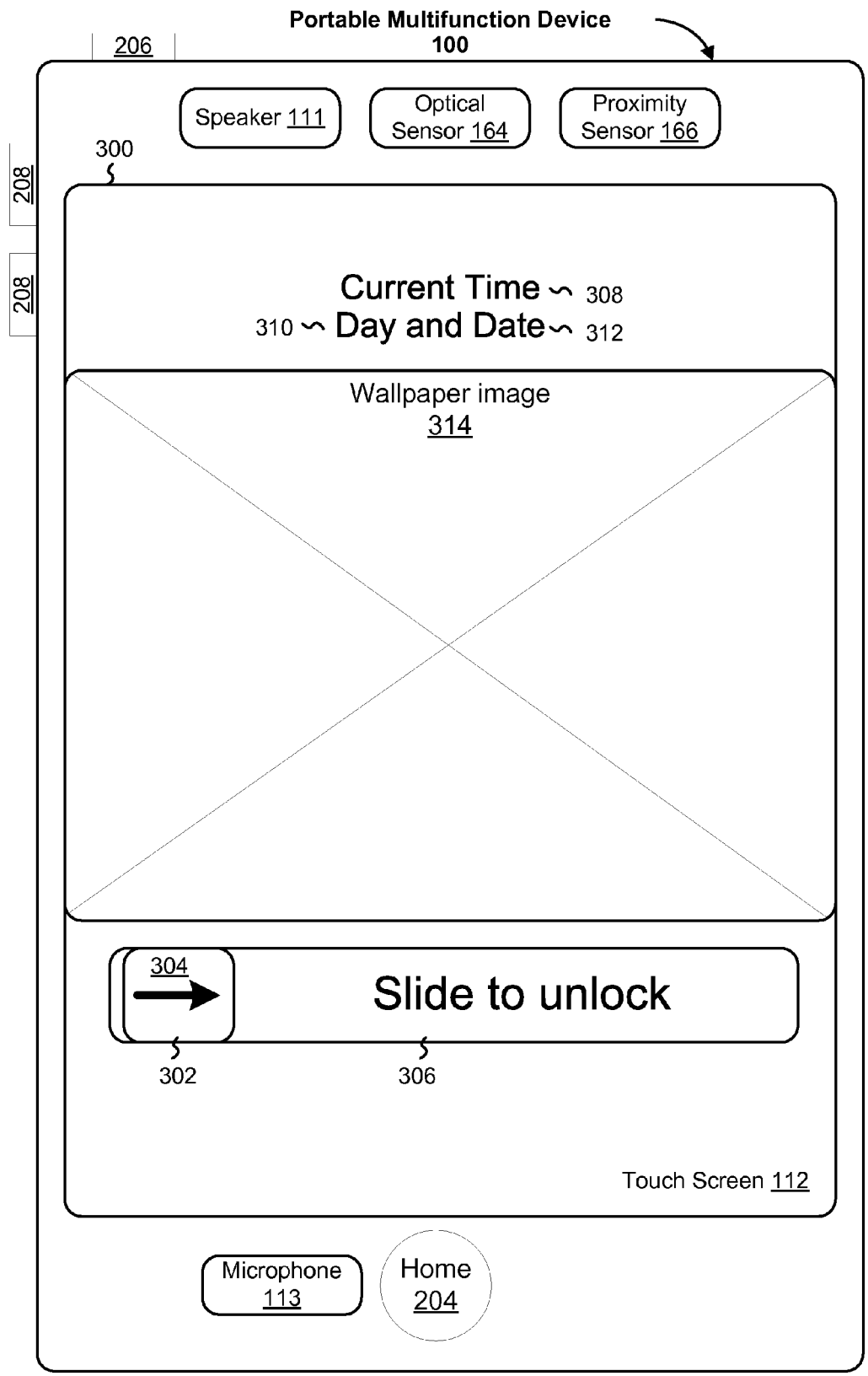
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:
  Unlock image 302 that is moved with a finger gesture to unlock the device;
  Arrow 304 that provides a visual cue to the unlock gesture;
  Channel 306 that provides additional cues to the unlock gesture;
  Time 308;
  Day 310;
  Date 312; and
  Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking a Device by Performing Gestures on an Unlock Image," filed Dec. 23, 2005, which is hereby incorporated by reference in its entirety.

Figure 4:
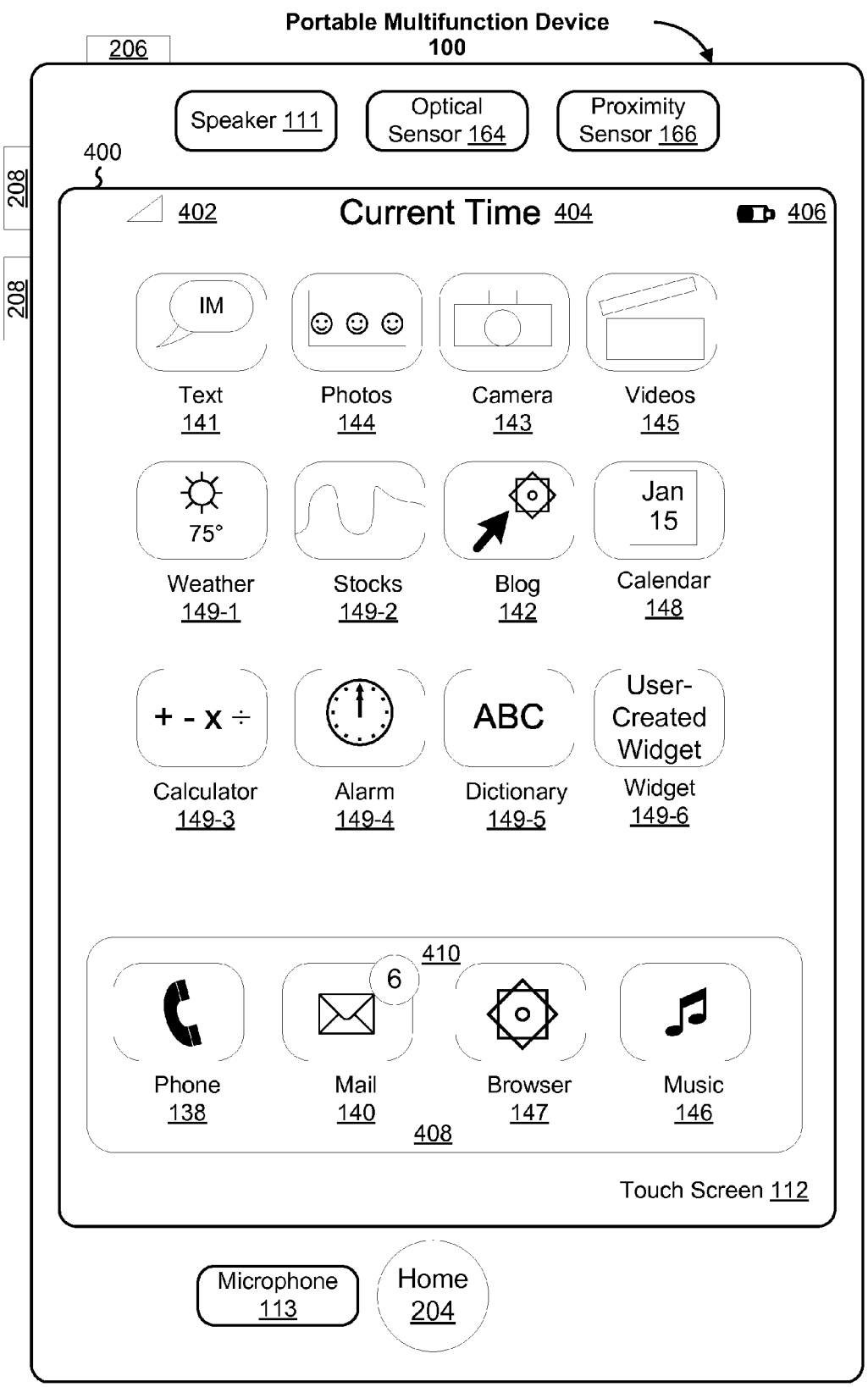
FIG. 4 illustrates an exemplary user interface for a menu of applications on a portable multifunction device in accordance with some embodiments.

FIG. 4 illustrates an exemplary user interface for a menu of applications on a portable multifunction device in accordance with some embodiments. In some embodiments, user interface 400 includes the following elements, or a subset or superset thereof:
  Signal strength indicator 402 for wireless communication;
  Time 404;
  Battery status indicator 406;
  Tray 408 with icons for frequently used applications, such as:
    Phone 138;
    E-mail client 140, which may include an indicator 410 of the number of unread e-mails;
    Browser 147; and
    Music player 146; and
  Icons for other applications, such as:
    IM 141;
    Image management 144;
    Camera 143;
    Video player 145;
    Weather 149-1;
    Stocks 149-2;
    Blog 142;
    Calendar 148;
    Calculator 149-3;
    Alarm clock 149-4;
    Dictionary 149-5; and
    User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating the desired application (e.g., by a tap or other finger gesture on the icon corresponding to the application).

In some embodiments, UI 400 provides integrated access to both widget-based applications and non-widget-based applications. In some embodiments, all of the widgets, whether user-created or not, are displayed in UI 400. In other embodiments, activating the icon for user-created widget 149-6 may lead to another UI (not shown) that contains the user-created widgets or icons corresponding to the user-created widgets.

In some embodiments, a user may rearrange the icons in UI 400, e.g., using processes described in U.S. patent application Ser. No. 11/459,602, "Portable Electronic Device With Interface Reconfiguration Mode," filed Jul. 24, 2006, which is hereby incorporated by reference in its entirety. For example, a user may move application icons in and out of tray 408 using finger gestures.

In some embodiments, UI 400 includes a gauge (not shown) that displays an updated account usage metric for an account associated with usage of the device (e.g., a cellular phone account), as described in U.S. patent application Ser. No. 11/322,552, "Account Information Display For Portable Communication Device," filed Dec. 23, 2005, which is hereby incorporated by reference in its entirety.

In general, the creation and display of digital artwork are not limited to portable multifunction devices. Embodiments of user interfaces and associated processes involving the creation and display of digital artwork may be implemented on other types of computers besides portable multifunction devices.

Figure 5:
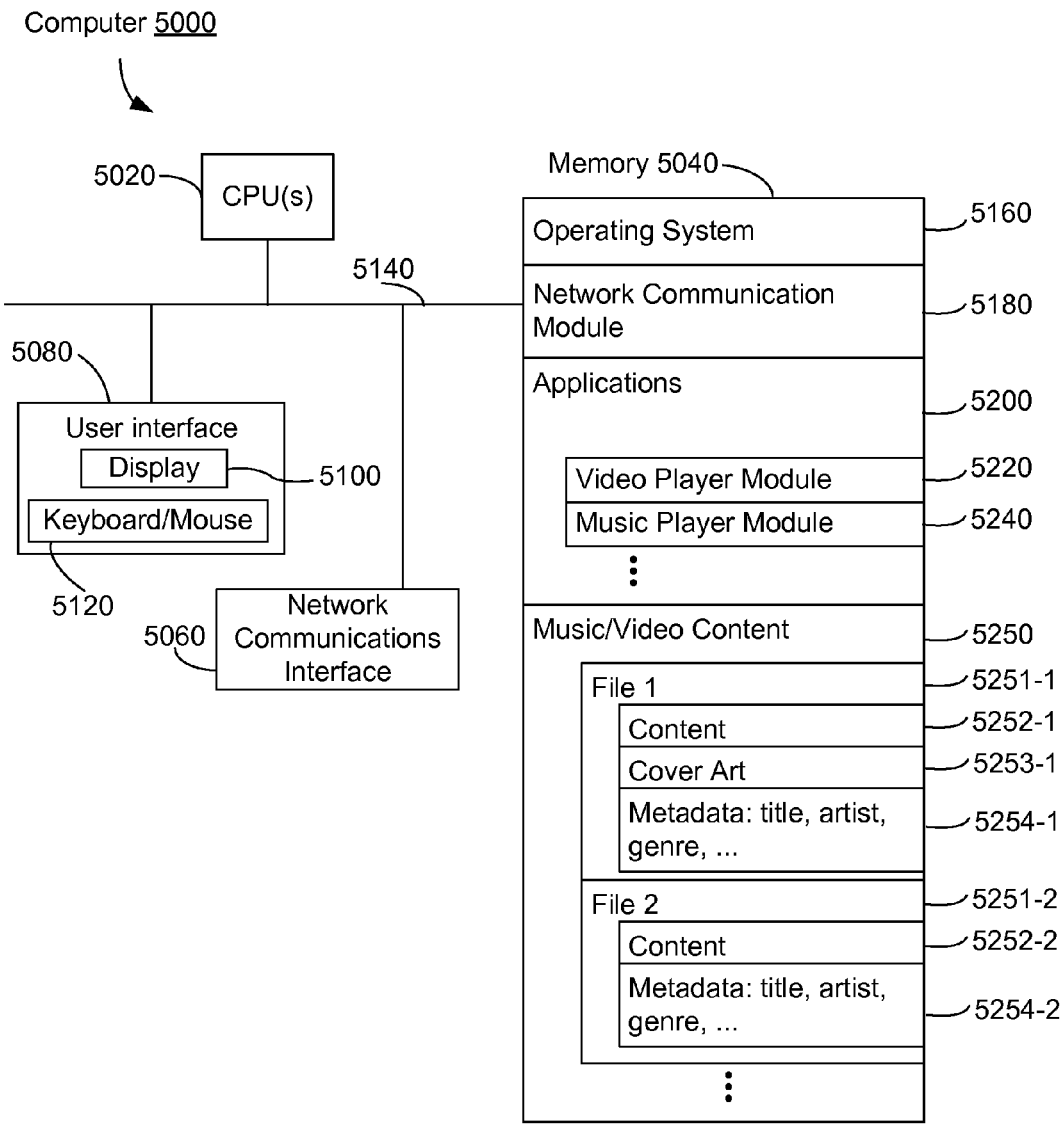
FIG. 5 is a block diagram illustrating a computer in accordance with some embodiments.

FIG. 5 is a block diagram illustrating a computer, such as a desktop or laptop computer, in accordance with some embodiments. The computer 5000 typically includes one or more processing units (CPU's) 5020, one or more network or other communications interfaces 5060, memory 5040, and one or more communication buses 5140 for interconnecting these components. The communication buses 5140 may include circuitry (sometimes called a chipset) that interconnects and controls communications between system components. The computer 5000 may also include a user interface 5080 comprising a display device 5100 and a keyboard and/or mouse (or other pointing device) 5120. In some embodiments, the display device 5100 is a touch-screen display. Memory 5040 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 5040 may optionally include one or more storage devices remotely located from the CPU(s) 5020. In some embodiments, memory 5040 stores the following programs, modules and data structures, or a subset thereof:

- an operating system 5160 that includes procedures for handling various basic system services and for performing hardware dependent tasks;
- a network communication module 5180 that is used for connecting the computer 5000 to other computers via the one or more communication network interfaces 5060 and one or more communication networks, such as the Internet, other wide area networks, local area networks, metropolitan area networks, and so on;
- applications 5200, including a video player module 5220 and a music player module 5240; and
- content 5250 (e.g., music files and/or video files), corresponding to content 170 in FIG. 1.

The video player module 5220 and the music player module 5240 are analogous to the video player module 145 and the music player module 146 in the portable multifunction device 100. The applications 5200 may include additional applications, such as applications analogous to other applications included in the applications 136 of the portable multifunction device 100.

The content 5250 includes a set of files 5251, each of which includes content 5252 and metadata 5254, such as metadata identifying the title, artist and genre of the content file, and optionally other types of metadata as well. Some of the content files 5251 have associated cover art 5252 that is stored with the content file 5251, while others of the content files do not.

Each of the above identified elements in FIG. 5 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 5040 may store a subset of the modules and data structures identified above. Furthermore, memory 5040 may store additional modules and data structures not described above.

Figure 6A:
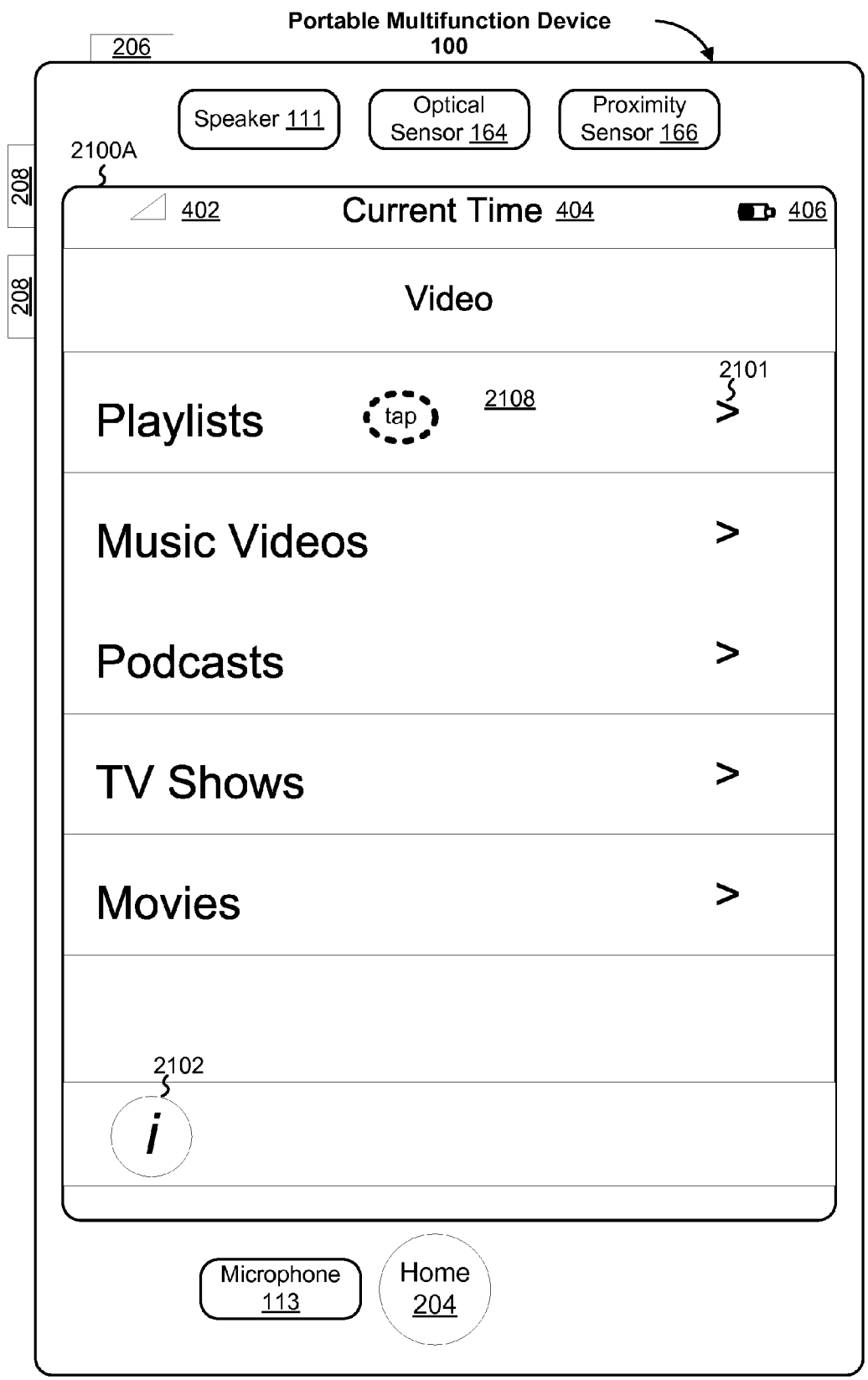
FIGS. 6A-6C illustrate an exemplary user interface for organizing and managing videos in accordance with some embodiments.
Figure 6B:
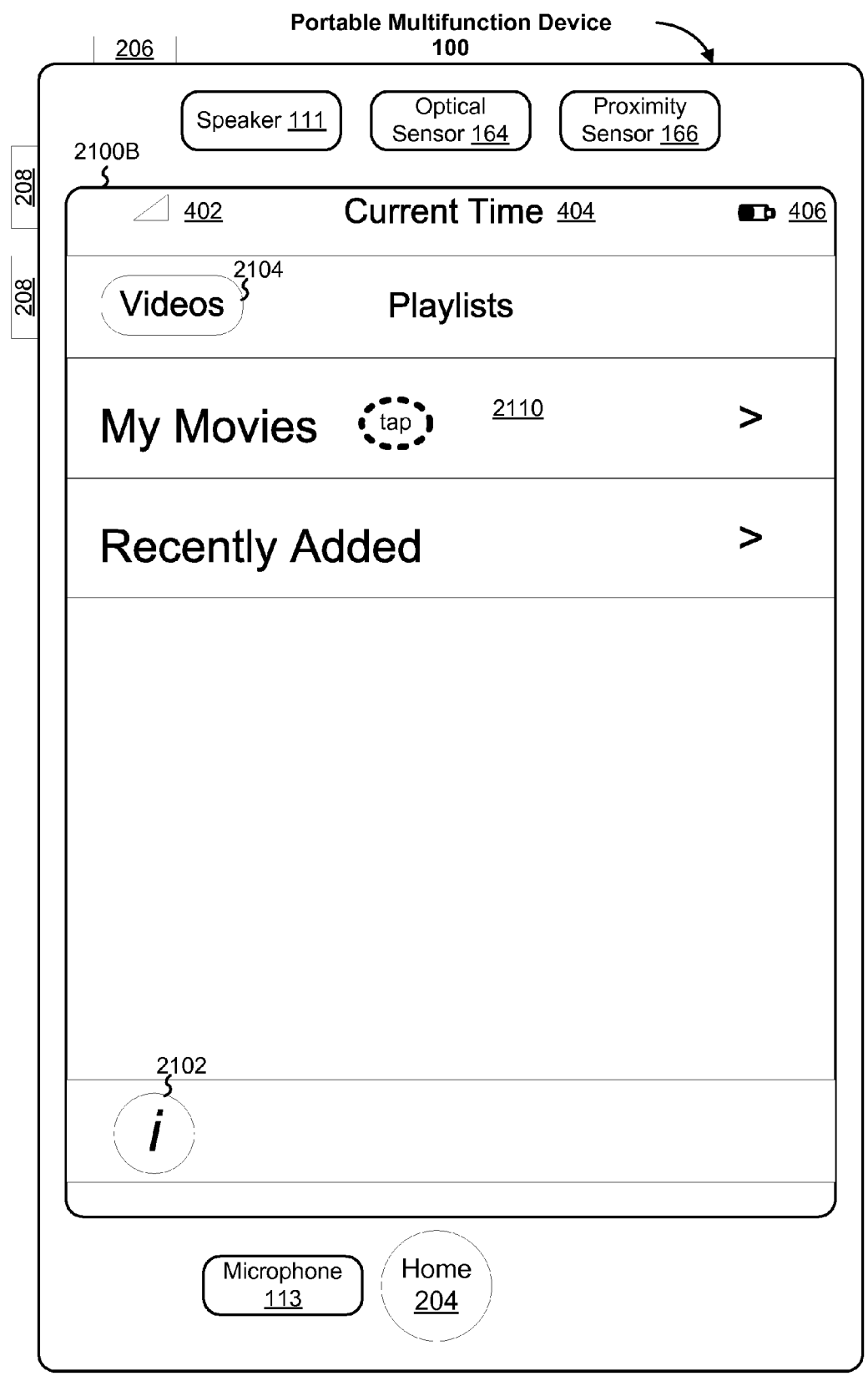
Figure 6C:
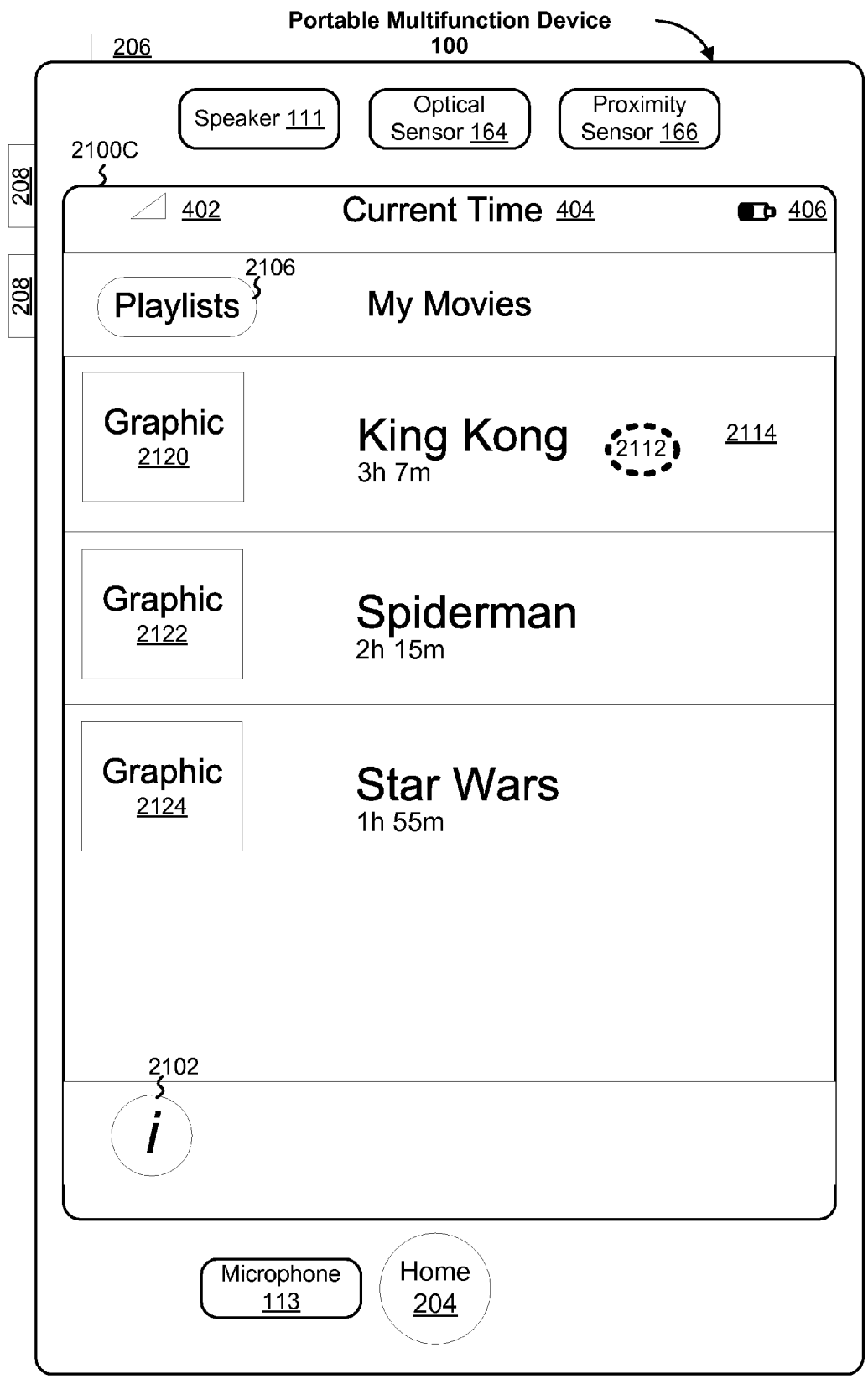

FIGS. 6A-6C illustrate an exemplary user interface for organizing and managing videos in accordance with some embodiments.

In some embodiments, in response to a series of gestures (e.g., finger taps) by the user, the device displays a series of video categories and sub-categories. For example, if the user activates selection icon 2101 (e.g., by a finger tap on the icon) or, in some embodiments, taps anywhere in the Playlists row 2108, the UI changes from a display of video categories (UI 2100A, FIG. 6A) to a display of Playlists sub-categories (UI 2100B, FIG. 6B). In turn, if the user activates the selection icon for My Movies (e.g., by a finger tap on the icon) or, in some embodiments, taps anywhere in the My Movies row 2110, the UI changes from a display of Playlists sub-categories (UI 2100B, FIG. 6B) to a display of My Movies sub-categories (UI 2100C, FIG. 6C), and so forth.

In some embodiments, in response to a series of gestures (e.g., finger taps) by the user, the device navigates back up through the hierarchy of video categories and sub-categories. For example, if the user activates Playlists icon 2106 (e.g., by a finger tap on the icon), the UI changes from a display of My Movies sub-categories (UI 2100C, FIG. 6C) to a display of Playlists sub-categories (UI 2100B, FIG. 6B). In turn, if the user activates the Videos icon 2104 (e.g., by a finger tap on the icon), the UI changes from a display of Playlists sub-categories (UI 2100B, FIG. 6B) to a display of video categories (UI 2100A, FIG. 6A).

In some embodiments, graphics 2120-2124 (FIG. 6C) corresponding to videos are listed next to the titles of the corresponding videos. In some embodiments, the graphics are digital artwork associated with the corresponding videos. In some embodiments, if no digital artwork is associated with a particular video, digital artwork is created based on metadata associated with the video and the created digital artwork is displayed. "Associated digital artwork" is typically digital artwork that is published along with the video, or that is available from the publisher of the video. For the purposes of this discussion, a video that does not have associated digital artwork is any video for which (A) associated digital artwork does not exist, or (B) associated digital artwork is not resident in or otherwise available to the device. When a listed video in the UI (e.g., UI 2100C) does not have associated digital artwork, the graphics 2120-2124 displayed (in the UI) with the listed video is digital artwork that has been generated based on metadata associated with the video. Digital artwork generated based on metadata is not "associated digital artwork." Creation and display of digital artwork is described further below with regard to FIGS. 10A-10C.

Figure 8A:
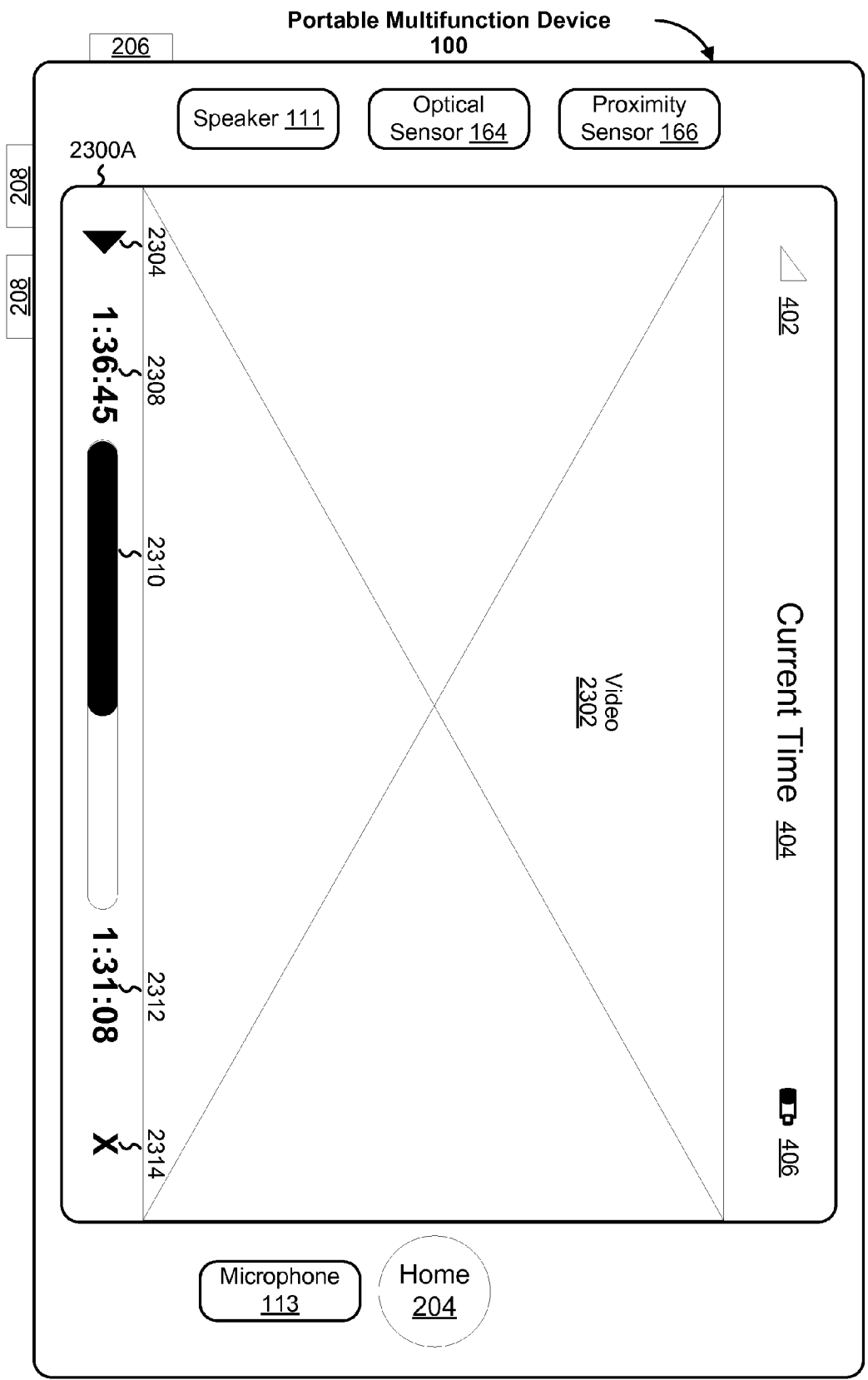
FIGS. 8A and 8B illustrate an exemplary user interface for a video player in accordance with some embodiments.

In some embodiments, in response to user selection of a particular video (e.g., by a tap 2112 or other predefined gesture on the graphic, title, or anywhere in the row 2114 for a particular video), the device displays the selected video (e.g., King Kong) in a video player UI (e.g., UI 2300A, FIG. 8A).

In some embodiments, in response to user selection of settings icon 2102 (e.g., by a finger tap on the icon), the device displays a settings UI (UI 2200A, FIG. 7A) for a video player.

Figure 7A:
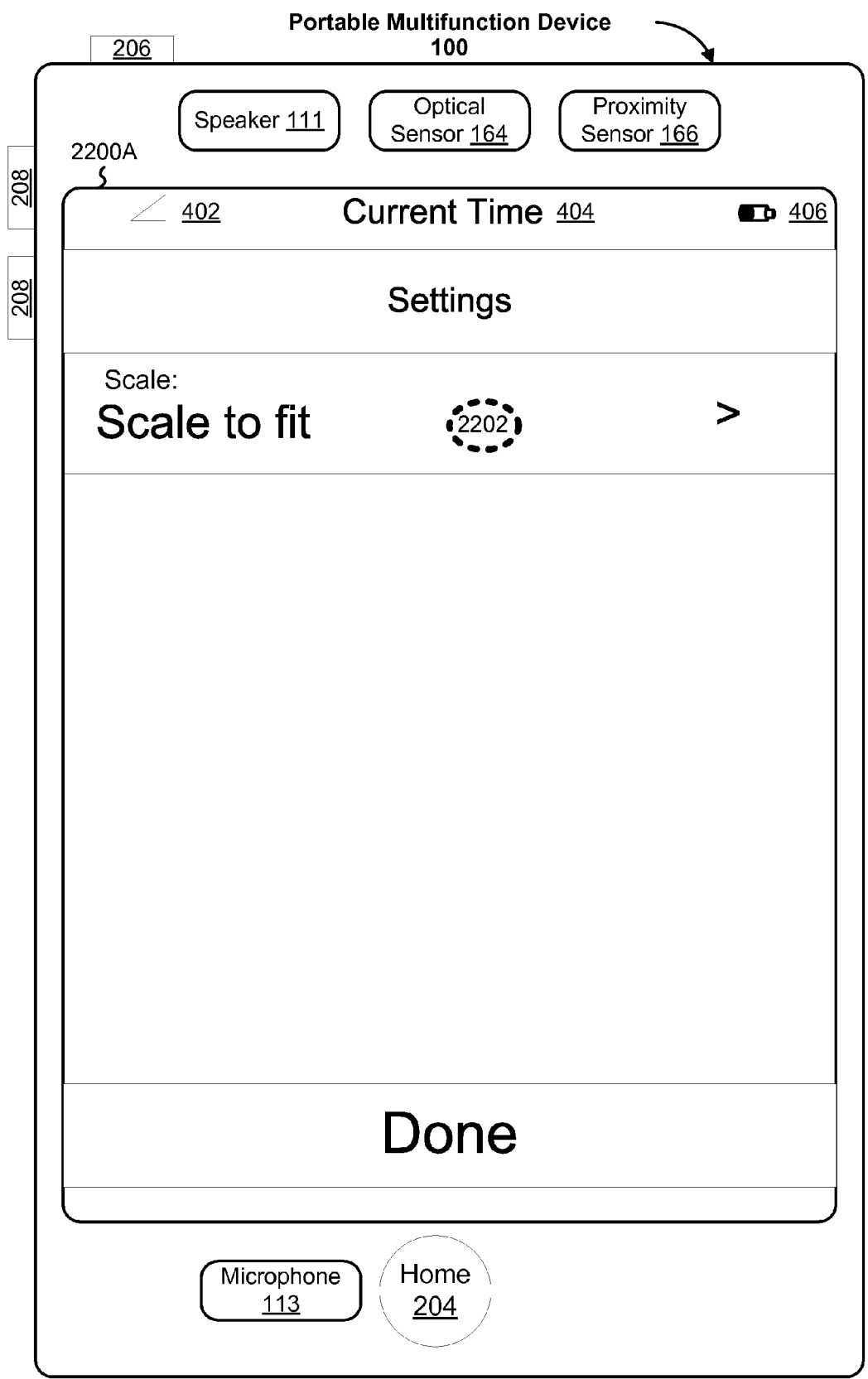
FIGS. 7A and 7B illustrate an exemplary user interface for setting user preferences for a video player in accordance with some embodiments.
Figure 7B:
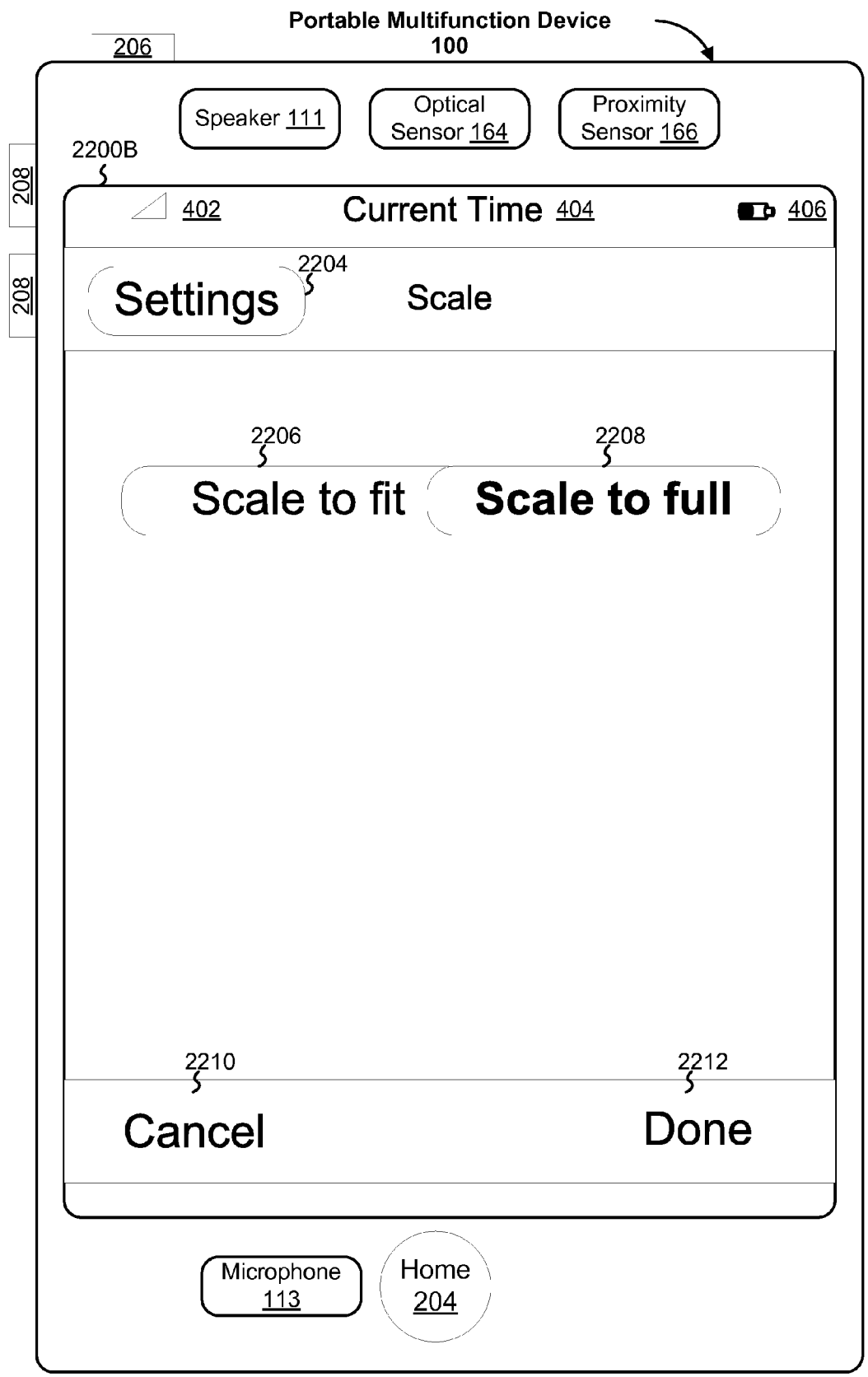

FIGS. 7A and 7B illustrate an exemplary user interface for setting user preferences for a video player in accordance with some embodiments.

In some embodiments, a user may make a tap or other predefined gesture anywhere in a row for a particular setting to initiate display of the corresponding setting choices. For example, in response to a tap 2202 on the Scale to fit setting (UI 2200A, FIG. 7A), the device displays the setting choices for scale to fit (UI 2200B, FIG. 7B).

Figure 8B:
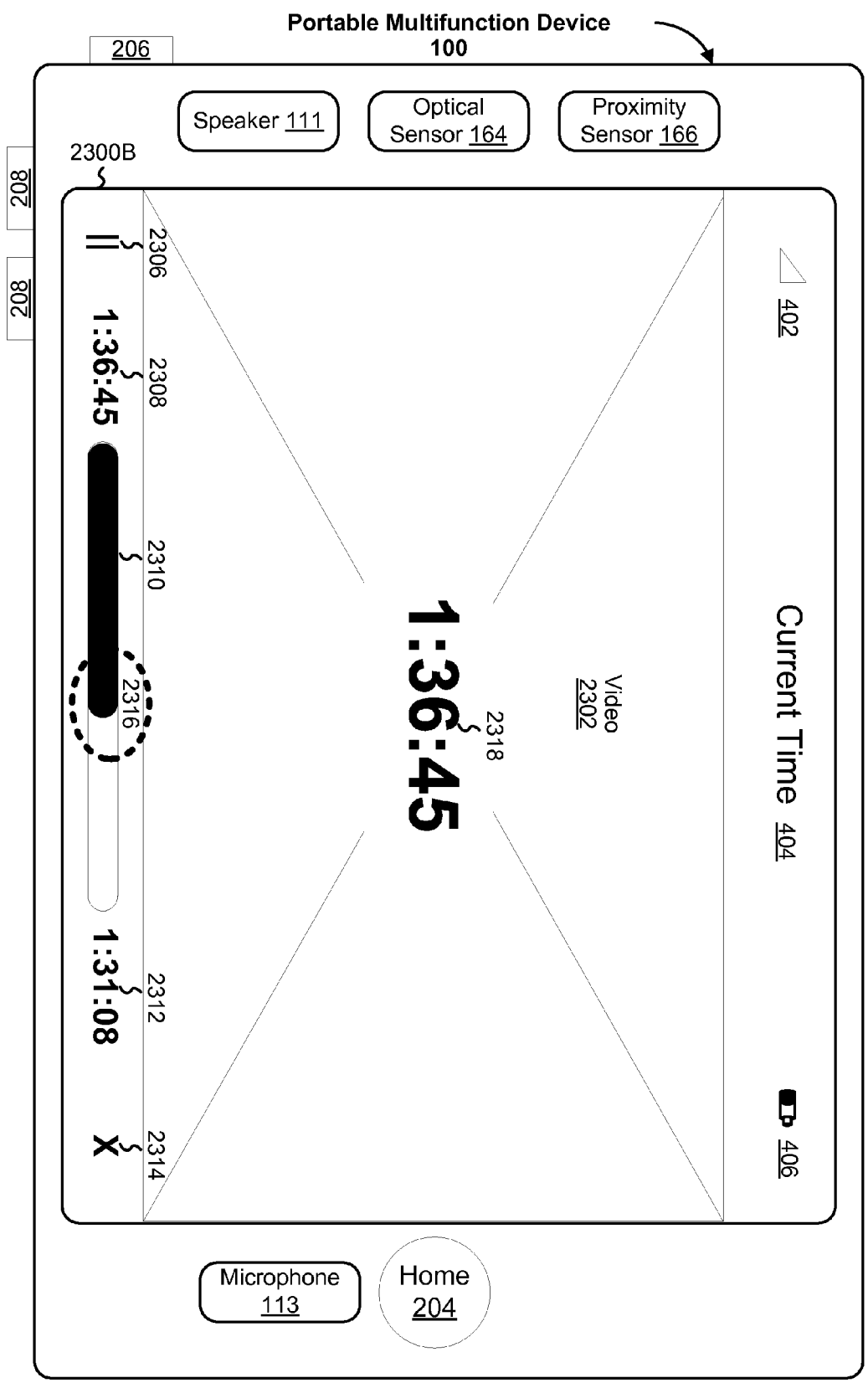

In some embodiments, user interface 2200B includes the following elements, or a subset or superset thereof:
- 402, 404, and 406, as described above;
- Settings icon 2204 that when activated (e.g., by a finger tap on the icon) returns the device to the settings UI (e.g., UI 2200A, FIG. 7A);
- Scale to fit icon 2206 that when activated (e.g., by a finger tap on the icon) sets the video player to scale the video to fit into the touch screen 112, which may result in two horizontal black bands (or more generally, background bands) at the top and bottom of the display for widescreen movies;
- Scale to full icon 2206 that when activated (e.g., by a finger tap on the icon) sets the video player to fill the touch screen 112 with the video;
- Cancel icon 2210 that when activated (e.g., by a finger tap on the icon) returns the device to the previous UI (e.g., UI 2200A, FIG. 7A) without saving any changes selected by the user; and
- Done icon 2212 that when activated (e.g., by a finger tap on the icon) saves the setting selected by the user and returns the device to the previous UI (e.g., UI 2200A, FIG. 7A);

FIGS. 8A and 8B illustrate an exemplary user interface for a video player in accordance with some embodiments. In some embodiments, user interfaces 2300A and 2300B includes the following elements, or a subset or superset thereof:
- 402, 404, and 406, as described above;
- Video display region 2302
- Play icon 2304 that when activated (e.g., by a finger tap on the icon) initiates playing a video, either from the beginning or from where the video was paused;
- Pause icon 2306 that when activated (e.g., by a finger tap on the icon) initiates pausing the video playing in video display region 2302;
- Lapsed time 2308 that shows how much of the video has been played, in units of time;
- Progress bar 2310 that indicates what fraction of the video has been played and that may be used to help scroll through the video in response to a user gesture;
- Remaining time 2312 that shows how much of the video remains to be played, in units of time;
- Exit icon 2314 that when activated (e.g., by a finger tap on the icon) initiates exiting the video player UI (e.g., UI 2300A, FIG. 8A) and returning to another UI (e.g., UI 2100C, FIG. 6C); and
- Enlarged lapsed time 2318 that may appear in response to a user gesture 2316 involving progress bar 2310.

In some embodiments, in response to user selection of a particular video (e.g., by a tap or other predefined gesture on the graphic, title, or anywhere 2112 in the row for a particular video in UI 2100C, FIG. 6C), the device displays the selected video (e.g., King Kong) in a video player UI (e.g., UI 2300A, FIG. 8A). In some embodiments, the device automatically displays the video in landscape mode on the touch screen, rather than in portrait mode, to increase the size of the image on the touch screen.

In some embodiments, graphics other than the video playing in video display region 2302 (e.g., graphics 2304, 2306 2308, 2310, 2312, and/or 2314) may fade out if there is no contact with the touch screen 112 for a predefined time. In some embodiments, these graphics may reappear if contact is made with the touch screen, thereby producing a "heads up display" effect for these graphics. In some embodiments, for wide screen movies displayed in fit-to-screen mode, graphics may be displayed in the black horizontal bands above and below the video display region 2302, to avoid obscuring the video.

In some embodiments, in response to a user gesture, the lapsed time in the video can be modified. For example, in response to the user's finger touching 2316 at or near the current playing position in the progress bar and then sliding along the progress bar, the lapsed time may be altered to correspond to the position of the user's finger along the progress bar. In some embodiments, enlarged lapsed time 2318 is displayed during this user gesture to indicate where the video will resume playing when the gesture is ended (FIG. 8B). In some embodiments, one or more still images from the video playing in video display region 2302 that correspond to where the video will resume playing are displayed as the user's finger is moved along the progress bar. This user gesture on the progress bar makes it easy for a user to select a particular scene in a video for viewing.

Figure 9A:
FIGS. 9A and 9B illustrate an exemplary user interface for a music player in accordance with some embodiments.
Figure 9B:
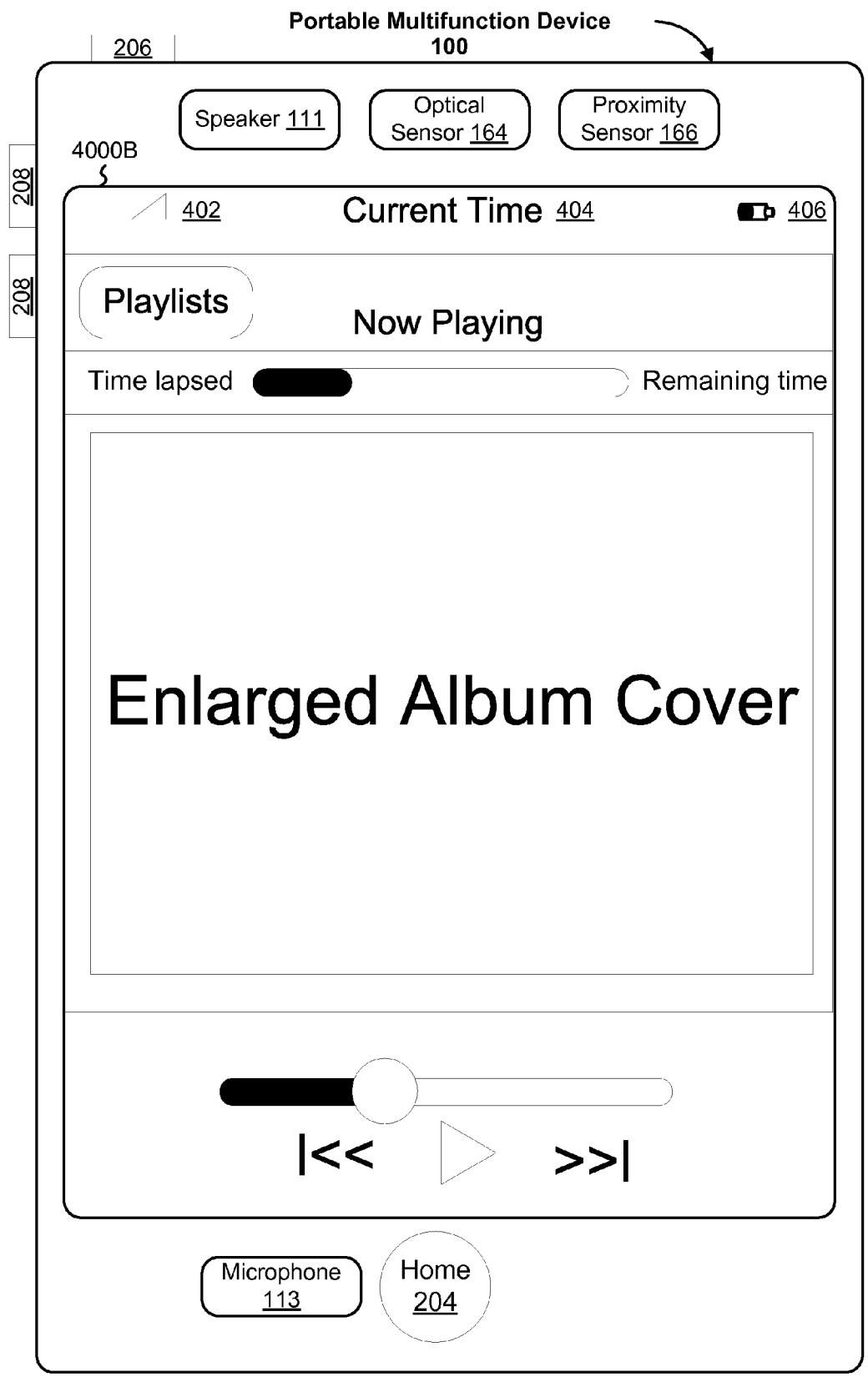

FIGS. 9A and 9B illustrate an exemplary user interface for a music player in accordance with some embodiments. The UI for the music player is typically very similar to the UI for the video player 145 described above. For example the user may navigate to user interfaces 4000A and 4000B via interfaces analogous to user interfaces 2100A through 2100C (FIGS. 6A-6C).

In some embodiments, in response to a user gesture, the lapsed time in the music (or other sound being played, e.g., a recorded lecture) can be modified. For example, in response to the user's finger touching 4002 at or near the current playing position in the progress bar and then sliding along the progress bar, the lapsed time may be altered to correspond to the position of the user's finger along the progress bar. In some embodiments, enlarged lapsed time is displayed during this user gesture to indicate where the music (or other sound being played) will resume playing when the gesture is ended (not shown). This user gesture on the progress bar makes it easy for a user to skip around within the music or other sound being played (e.g., to let the user listen to a favorite part.)

In some embodiments, an album graphic 4010 is displayed while a corresponding album is played. In some embodiments, the album graphic 4010 is digital artwork associated with the album, such as an album cover or a CD cover. In some embodiments, if no digital artwork is associated with the album, digital artwork is created based on metadata associated with the album and the created digital artwork is displayed as the album graphic 4010. Creation and display of digital artwork is described further below with regard to FIGS. 10A-10C.

In some embodiments, in response to a tap or other predefined gesture on the album graphic 4010, the music player UI toggles between displaying an enlarged view of the album graphic (UI 4000B, FIG. 9B) and displaying a smaller view with additional information about the music or other sound being played.

Figure 10A:
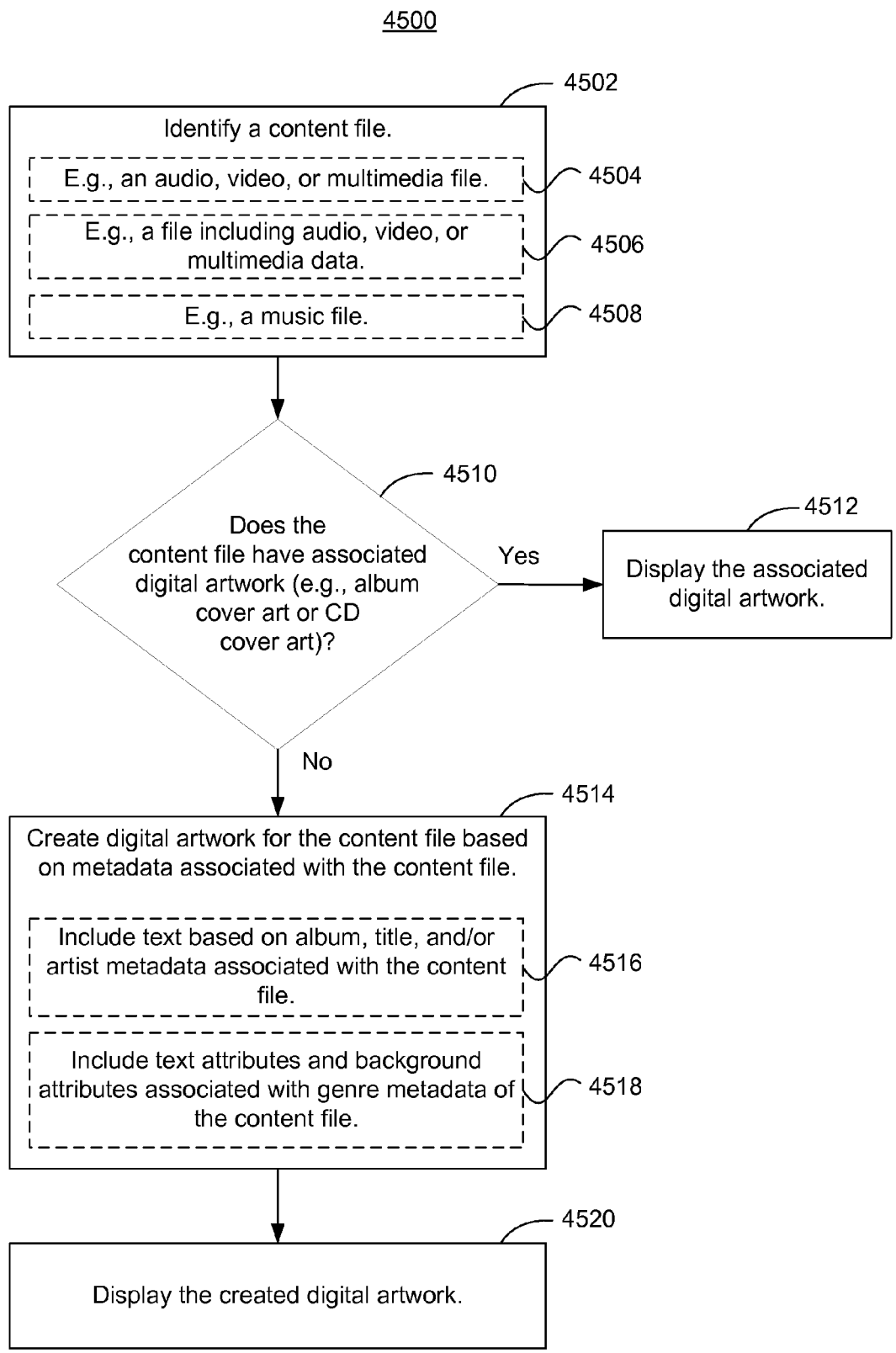
FIGS. 10A-10C are flow diagrams illustrating a computer-implemented method of creating and displaying digital artwork, in accordance with some embodiments.

FIG. 10A is a flow diagram illustrating a computer-implemented method 4500 of creating and displaying digital artwork, in accordance with some embodiments. A content file is identified (4502). In some embodiments, the content file comprises an audio file, a video file, or a multimedia file (4504). In some embodiments, the content file includes audio, video, or multimedia data (4506). In some embodiments, the content file is a music file (4508). In some embodiments, the content file comprises an H.261, H.262, H.263, H.264, AAC (Advanced Audio Coding), AC3, MP3, MP3 VBR (Variable Bit Rate), AIFF (Audio Interchange File Format), Apple Lossless, WAV, AA, MPEG-1, MPEG-2, MPEG-4, MJPEG, VP6, VP7, RealAudio, RealVideo, WMA, WMV, or Quicktime file.

Whether or not the content file has associated digital artwork is determined (4510). In some embodiments, the associated digital artwork comprises album cover art or CD cover art, such as album cover 4010 (FIG. 9A). In some embodiments, the associated digital artwork corresponds to a movie, as for graphics 2120-2124 (FIG. 6C). In some embodiments, if the content file does have associated digital artwork (4510-Yes), the associated digital artwork is displayed (4512).

If the content file does not have associated digital artwork (4510-No), digital artwork for the content file is created based on metadata associated with the content file (4514). In some embodiments, the created digital artwork includes text based on album, title, and/or artist metadata associated with the content file (4516). In some embodiments, the created digital artwork includes text attributes and background attributes associated with genre metadata of the content file (4518). The text attributes may include font style, font size, and/or font color. The background attributes may include one or more background colors and/or background graphics.

The created digital artwork is displayed (4520). For example, if the created digital artwork corresponds to a movie, the created digital artwork may be displayed next to the title of the movie in a list of movies (e.g., UI 2100C, FIG. 6C). If the created digital artwork corresponds to an album, the created digital artwork may be displayed by a music player application (e.g., music player 146, FIG. 1, or 5240, FIG. 5) while the album is being played, as shown in FIGS. 9A and 9B.

Figure 10B:
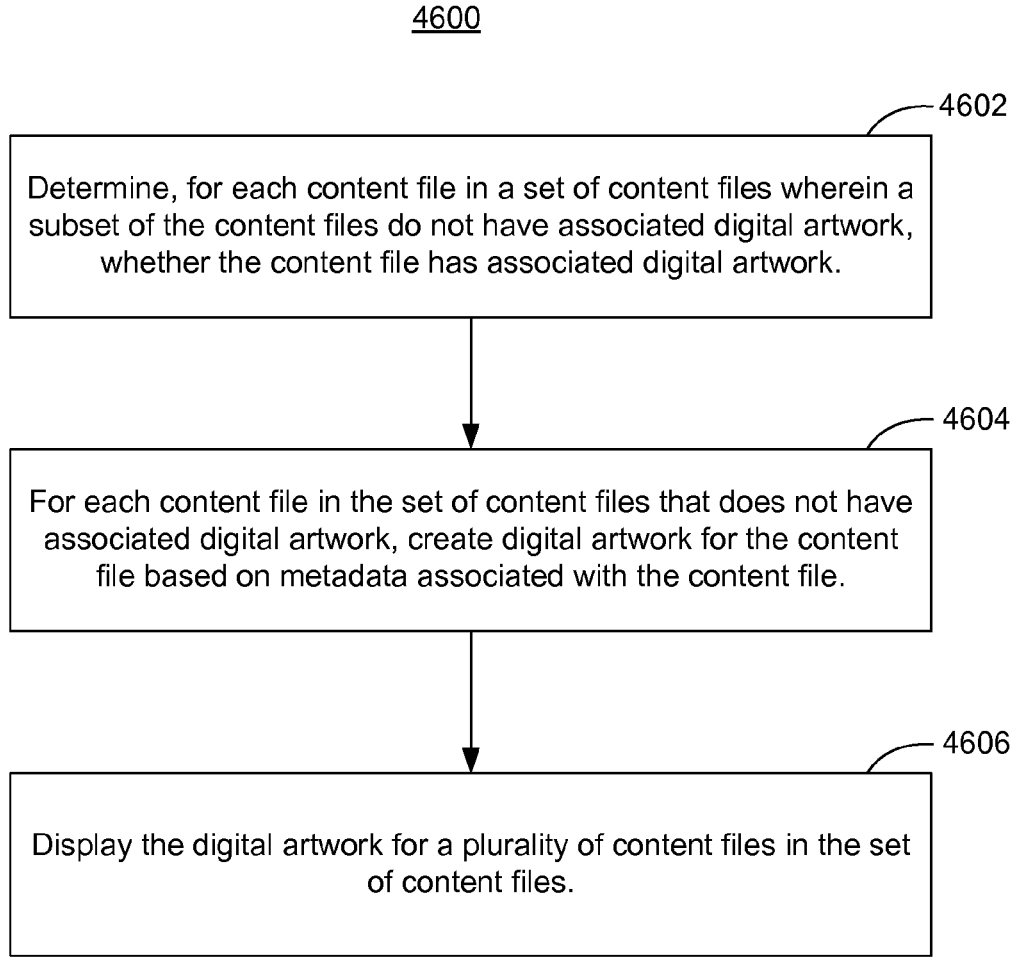

FIG. 10B is a flow diagram illustrating a computer-implemented method 4600 of creating and displaying digital artwork, in accordance with some embodiments. Method 4600 applies to a set of content files including a subset of the content files that do not have associated digital artwork. In some embodiments, the content files comprise audio files, video files, and/or multimedia files. In some embodiments, the content files include audio, video, and/or multimedia data. In some embodiments, the content files are music files. In some embodiments, the content files comprise H.261, H.262, H.263, H.264, AAC (Advanced Audio Coding), AC3, MP3, MP3 VBR (Variable Bit Rate), AIFF (Audio Interchange File Format), Apple Lossless, WAV, AA, MPEG-1, MPEG-2, MPEG-4, MJPEG, VP6, VP7, RealAudio, RealVideo, WMA, WMV, and/or Quicktime files.

For each content file in the set of content files, whether the content file has associated digital artwork is determined (4602). In some embodiments, the associated digital artwork comprises album cover art or CD cover art, such as album cover graphic 4010 (FIG. 9A). In some embodiments, the associated digital artwork corresponds to a movie, as for graphics 2120-2124 (FIG. 6C).

For each content file in the set of content files that does not have associated digital artwork, digital artwork is created based on metadata associated with the content file (4604). In some embodiments, the created digital artwork includes text based on album, title, and/or artist metadata associated with the content file. In some embodiments, the created digital artwork includes text attributes and background attributes associated with genre metadata of the content file. The text attributes may include font style, font size, and/or font color. The background attributes may include one or more background colors and/or background graphics.

The digital artwork for a plurality of content files in the set of content files is displayed (4606). For example, if the created digital artwork corresponds to a movie, the created digital artwork may be displayed next to the title of the movie in a list of movies (e.g., UI 2100C, FIG. 6C). If the created digital artwork corresponds to an album, the created digital artwork may be displayed by a music player application (e.g., music player 146, FIG. 1, or 5240, FIG. 5) while the album is being played, as shown in FIGS. 9A and 9B.

Figure 10C:
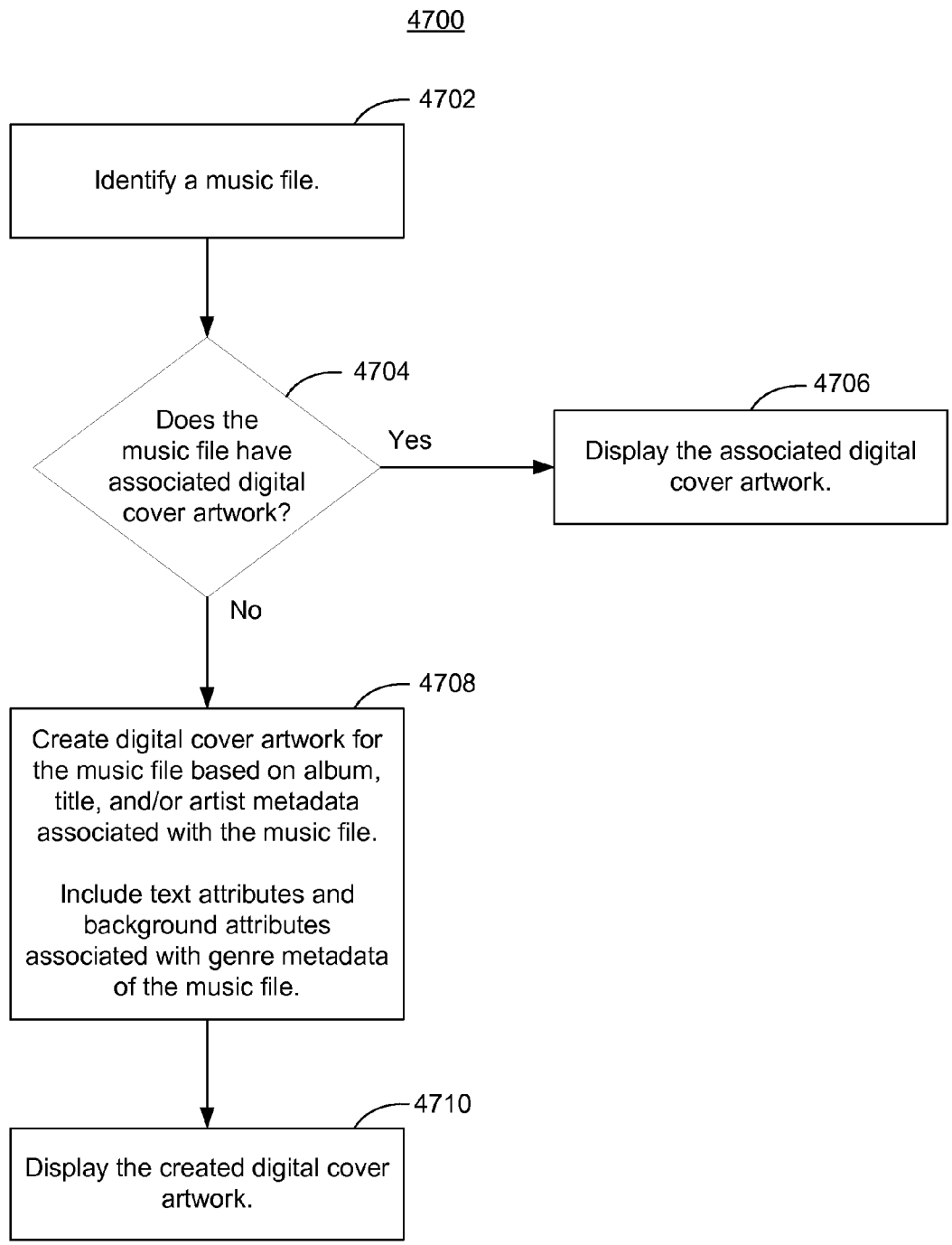

FIG. 10C is a flow diagram illustrating a computer-implemented method 4700 of creating and displaying digital artwork, in accordance with some embodiments. A music file is identified (4702). Whether or not the music file has associated digital cover artwork is determined (4704). In some embodiments, the associated digital cover artwork comprises album cover art or CD cover art, such as album cover graphic 4010 (FIG. 9A). In some embodiments, if the content file has associated digital artwork (4704-Yes), the associated digital artwork is displayed (4706).

If the music file does not have associated digital cover artwork (4704-No), digital cover artwork for the music file is created based on album, title, and/or artist metadata associated with the music file. The created digital cover artwork includes text attributes and background attributes associated with genre metadata of the music file (4708). The text attributes may include font style, font size, and/or font color. The background attributes may include one or more background colors and/or background graphics.

The created digital cover artwork is displayed (4710). For example, the created digital cover artwork may be displayed by a music player application (e.g., music player 146, FIG. 1, or 5240, FIG. 5) while the album is being played, as shown in FIGS. 9A and 9B.

In some embodiments, processes 4500, 4600, 4700, or similar methods for creating digital artwork create the same digital artwork when performed on different computers, for a given content file and its associated metadata. In some embodiments, performing repeated iterations of processes 4500, 4600, 4700, or similar methods for creating digital artwork creates the same digital artwork, for a given content file and its associated metadata. This repeatability ensures that the created digital artwork is persistent.

In some embodiments, digital cover artwork is created by selecting a template based on the genre metadata of the corresponding music file, inserting relevant metadata into the template, and randomly modifying aspects of the template. In some embodiments, a different template exists for each of a plurality of defined genres of music, as specified in the music file metadata. Once a template has been selected based on the music file's genre metadata, metadata such as the artist name and the album title is added to specified fields in the selected template. Other aspects of the cover are then randomly selected, based on a set of options specified by the template.

Examples of randomly selected aspects of the cover may include font type(s), font color(s), font size(s), capitalization, and/or background color(s). A template may specify a font type or may include a set of font types from which one or more font types may be randomly selected. A template may specify one or more background colors or may include a palette of background colors from which one or more background colors may be randomly selected. Similar sets of options may exist for other aspects, such as font sizes, font colors, and capitalization schemes. In some embodiments, the randomly selected aspects are tested against rules to ensure that the resulting created digital artwork is useful to a viewer. For example, the rules may ensure that the font color is clearly distinguishable from the background color.

In some embodiments, randomly selected aspects of the cover are selected using metadata from the corresponding music file as a seed. For example, a seed may be calculated based on the text of the album title. Use of a specific seed ensures that the created digital artwork is persistent: the same digital artwork will be created for a corresponding music file on different computers and repeated iterations of digital cover artwork creation for a corresponding music file will produce the same digital cover artwork.

Figure 11A:
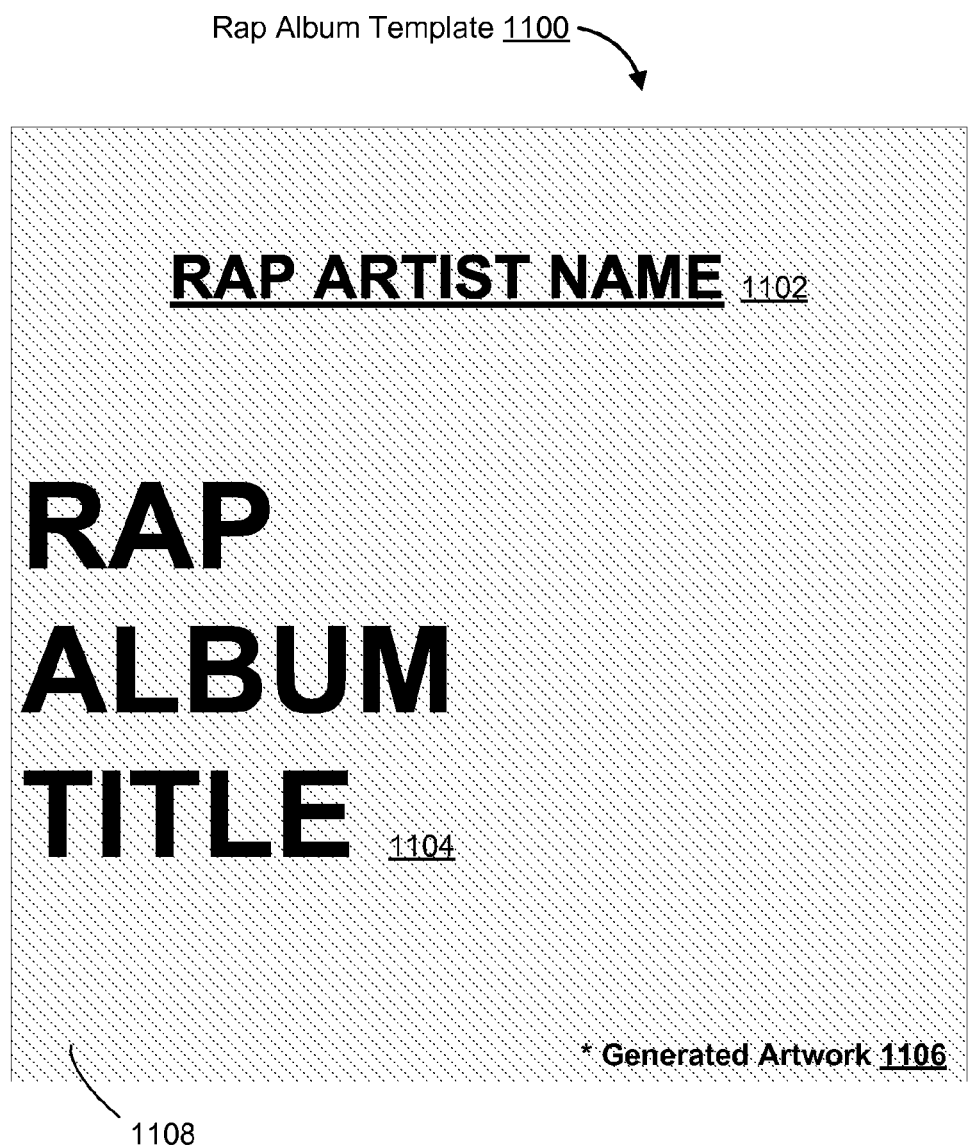
FIGS. 11A-11C illustrate templates for creating digital cover artwork in accordance with some embodiments.
Figure 11B:
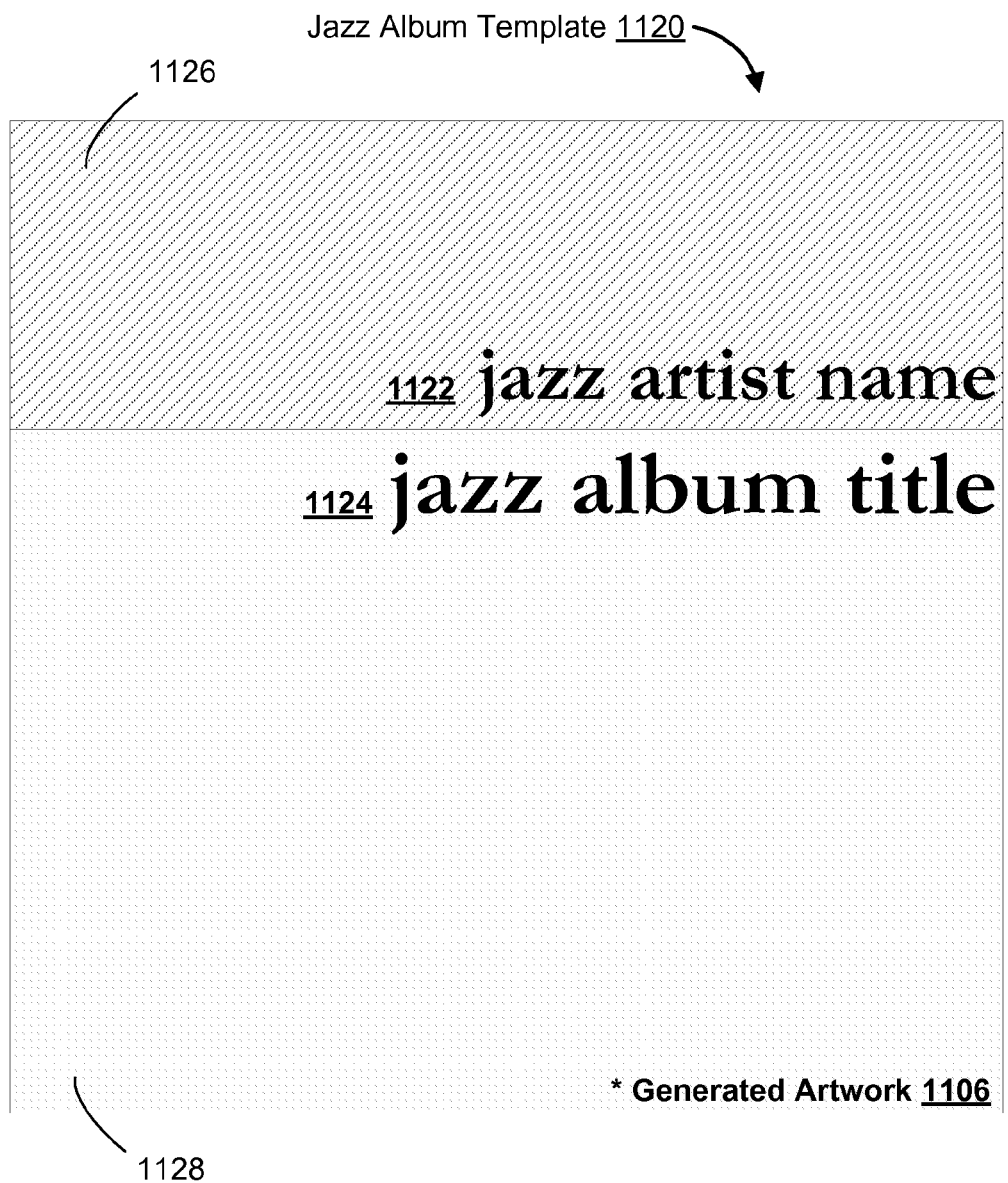
Figure 11C:
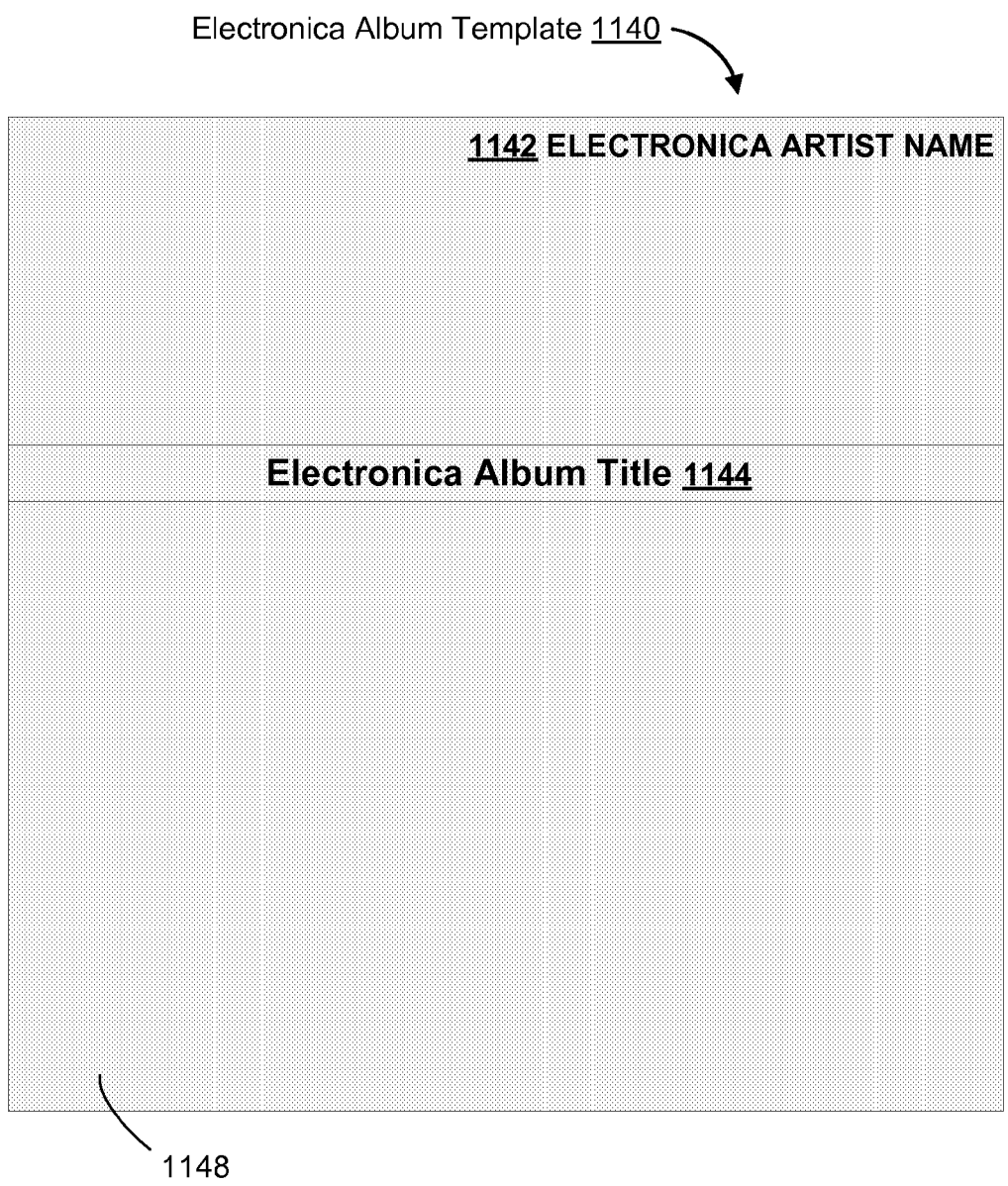

FIGS. 11A-11C illustrate templates for creating digital cover artwork in accordance with some embodiments. FIG. 11A illustrates a rap album template 1100 used to generate digital cover artwork corresponding to a music file containing rap music, as specified by the music file's genre metadata, in accordance with some embodiments. Template 1100 includes fields for the rap artist name 1102 and the rap album title 1104. In some embodiments, all letters are capitalized and displayed in a bold font. In some embodiments, the artist name 1102 is displayed using a black font color and the album title 1104 is displayed using a white font color (not shown). A background color 1108 (indicated in FIG. 11A by the fill pattern) is chosen from an available palette of colors. The background color 1108 of the created digital cover artwork for a respective album, or other content, may be selected based on a predefined function of the metadata for the respective album or other content. For example, the metadata may be mapped to a value having a predefined number of bits or bytes by a one-way hash function, and then the resulting hash value may be mapped to a color in the available palette. Alternately, the hash value itself may represent a color identifier in the available palette. By using a predefined function to select the background color, the color of the created artwork for a particular album or other content is the same every time the created artwork for the album or other content is generated and displayed. Alternately, the background color 1108 of the created digital cover artwork for a respective album, or other content, may be randomly chosen from the available palette of color, in which case the color of the created digital cover artwork for a particular album or other content may vary from time to time or from one device to another. In yet another embodiment, a random number generator using a seed calculated from metadata (e.g., the album title) determines the background color of the created artwork, in which case the background color of the created artwork for a particular album or other content may be consistent from device to device and from time to time. In some embodiments, all colors in the available palette have high saturation. The rap artist name 1102 and the rap album title 1104 are clearly distinguishable from the background color 1108. In some embodiments, a disclaimer 1106 indicates that the artwork has been generated and therefore is not original album or CD cover artwork.

FIG. 11B illustrates a jazz album template 1120 used to generate digital cover artwork corresponding to a music file containing jazz music, as specified by the music file's genre metadata, in accordance with some embodiments. Template 1120 includes fields for the jazz artist name 1122 and the jazz album title 1124. The jazz artist name 1122 is displayed in an upper portion of the template 1120 and the jazz album title 1124 is displayed in a lower portion of the template 1120. In some embodiments, all letters are displayed in lower case. In some embodiments, a random number generator using a seed calculated from metadata (e.g., the album title) determines whether all letters are displayed in lower case or whether the first letter of each word is capitalized and the remaining letters are displayed in lower case. In some embodiments, the font used to display the jazz artist name 1122 and the jazz album title 1124 is more rounded than the font used in the rap album template 1100 (FIG. 11A). The upper portion of the template 1120 has a background color 1126 (indicated by the fill pattern of diagonal lines) and the lower portion has a background color 1128 (indicated by the cross-hatched fill pattern) that is different from the upper portion background color 1126. The jazz artist name 1122 and the jazz album title 1124 are displayed in a font color that is clearly distinguishable from both background colors 1126 and 1128. In some embodiments, a disclaimer 1106 indicates that the artwork has been generated and therefore is not original album or CD cover artwork.

FIG. 11C illustrates an electronica album template 1140 used to generate digital cover artwork corresponding to a music file containing electronica music, as specified by the music file's genre metadata, in accordance with some embodiments. Template 1140 includes fields for the electronica artist name 1142 and the electronica album title 1144. The electronica artist name 1142 is displayed in the upper-right portion of the template 1140 and the electronica album title 1144 is displayed in a stripe in the middle of the template 1140. In some embodiments, all text is displayed using a white font color. As described above, a background color 1148 (indicated by the gray fill in FIG. 11C) is chosen from an available palette of colors. In some embodiments, the saturation of the background color 1148 varies across the template 1140. For example, as shown in FIG. 11C, the saturation is high at the bottom of the template 1140 (as indicated by the dark gray fill) and low at the top of the template 1140, where the background color 1148 appears to be nearly white. In some embodiments, the brightness and/or the hue of the background color 1148 may vary across the template 1140. In some embodiments, a disclaimer 1106 indicates that the artwork has been generated and therefore is not original album or CD cover artwork. In some embodiments, however, the disclaimer 1106 is absent, as shown in FIG. 11C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
   determining if a music file has associated digital cover artwork;
   if the music file does not have associated digital cover artwork, automatically creating customized digital cover artwork for the music file based on album, title, and/or artist metadata associated with the music file, wherein creating the digital cover artwork includes:
  selecting a template based on genre metadata of the music file;
  inserting metadata associated with the music file into the template; and
  randomly modifying aspects of the template selected from the group comprising font type, font color, font size, capitalization, and/or background color, wherein the aspects of the template are selected using metadata from the music file as a seed; and
displaying the created digital cover artwork.

2. The method of claim 1, wherein, for a given content file and its associated metadata, performing the method on different computers creates the same digital artwork.

3. A method, comprising:
determining, for each content file in a set of content files wherein a subset of the content files in the set of content files do not have associated digital artwork, whether the content file has associated digital artwork;
for each content file in the set of content files that does not have associated digital artwork, automatically creating customized digital artwork for the content file based on metadata associated with the content file, wherein creating the digital artwork includes:
  selecting a template based on genre metadata of the content file;
  inserting metadata associated with the content file into the template; and
  randomly modifying aspects of the template selected from the group comprising font type, font color, font size, capitalization, and/or background color, wherein the aspects of the template are selected using metadata from the content file as a seed; and
displaying the digital artwork for a plurality of content files in the set of content files.

4. The method of claim 3, wherein, for a given content file and its associated metadata, performing the method on different computers creates the same digital artwork.

5. A method, comprising:
at an electronic device:
  determining if a content file has associated digital artwork;
  if the content file does not have associated digital artwork, automatically creating customized digital artwork for the content file based on metadata associated with the content file, wherein creating the digital artwork includes:
    selecting a template based on genre metadata of the content file;
    inserting metadata associated with the content file into the template; and
    randomly modifying aspects of the template selected from the group comprising font type, font color, font size, capitalization, and/or background color, wherein the aspects of the template are selected using metadata from the content file as a seed; and
  displaying the created digital artwork.

6. The method of claim 5, wherein the content file comprises an audio file, a video file, or a multimedia file.

7. The method of claim 5, wherein the content file includes audio data, video data, or multimedia data.

8. The method of claim 5, wherein the content file is a music file.

9. The method of claim 5, wherein the content file comprises an H.261, H.262, H.263, H.264, AAC (Advanced Audio Coding), AC3, MP3, MP3 VBR (Variable Bit Rate), AIFF (Audio Interchange File Format), Apple Lossless, WAV, AA, MPEG-1, MPEG-2, MPEG-4, MJPEG, VP6, VP7, RealAudio, RealVideo, WMA, WMV, or Quicktime file.

10. The method of claim 5, wherein the associated digital artwork comprises album cover art or CD cover art.

11. The method of claim 5, wherein the created digital artwork includes text based on album, title, and/or artist metadata associated with the content file.

12. The method of claim 5, wherein the text attributes include font style, font size, and/or font color.

13. The method of claim 5, wherein the background attributes include one or more background colors and/or background graphics.

14. The method of claim 5, wherein, for a given content file and its associated metadata, performing the method on different computers creates the same digital artwork.

15. The method of claim 5, wherein, for a given content file and its associated metadata, repeated iterations of the method create the same digital artwork.

16. A graphical user interface on a computer, comprising:
one or more pieces of digital artwork, corresponding to one or more content files, displayed on a computer screen,
wherein, for a respective piece of digital artwork:
  if a content file has an associated digital artwork, the respective piece of digital artwork displayed on the computer screen is the associated digital artwork; and
  if a content file does not have an associated digital artwork, the respective piece of digital artwork displayed on the computer screen comprises customized digital artwork automatically created based on metadata associated with the content file, wherein creating the digital artwork includes:
    selecting a template based on genre metadata of the content file;
    inserting metadata associated with the content file into the template; and
    randomly modifying aspects of the template selected from the group comprising font type, font color, font size, capitalization, and/or background color, wherein the aspects of the template are selected using metadata from the content file as a seed.

17. An electronic device, comprising:
a display;
one or more processors;
memory; and
one or more programs, wherein the one or more programs are stored in the memory and configured to be executed by the one or more processors, the programs including instructions for:
  determining if a content file has associated digital artwork;
instructions for automatically creating customized digital artwork for the content file based on metadata associated with the content file, if the content file does not have associated digital artwork, wherein creating the digital artwork includes:
  selecting a template based on genre metadata of the content file;
  inserting metadata associated with the content file into the template; and
  randomly modifying aspects of the template selected from the group comprising font type, font color, font size, capitalization, and/or background color, wherein the aspects of the template are selected using metadata from the content file as a seed;
displaying the created digital artwork.

18. The device of claim 17, wherein, for a given content file and its associated metadata, performing the instructions on different computers creates the same digital artwork.

19. A non-transitory computer readable storage medium storing one or more programs, the one or more programs comprising instructions, which when executed by an electronic device with a display, cause the device to:
determine if a content file has associated digital artwork;
automatically create customized digital artwork for the content file based on metadata associated with the content file, if the content file does not have associated digital artwork, wherein creating the digital artwork includes:
  selecting a template based on genre metadata of the content file;
  inserting metadata associated with the content file into the template; and
  randomly modifying aspects of the template selected from the group comprising font type, font color, font size, capitalization, and/or background color, wherein the aspects of the template are selected using metadata from the content file as a seed; and
display the created digital artwork.

20. The computer readable storage medium of claim 19, wherein, for a given content file and its associated metadata, performing the instructions on different computers creates the same digital artwork.

21. An electronic device, comprising:
a display;
one or more processors;
memory; and
one or more programs, wherein the one or more programs are stored in the memory and configured to be executed by the one or more processors, the programs including instructions for:
determining if a music file has associated digital cover artwork;
if the music file does not have associated digital cover artwork, automatically creating customized digital cover artwork for the music file based on album, title, and/or artist metadata associated with the music file, wherein creating the digital cover artwork includes:
  selecting a template based on genre metadata of the music file;
  inserting metadata associated with the music file into the template; and
  randomly modifying aspects of the template selected from the group comprising font type, font color, font size, capitalization, and/or background color, wherein the aspects of the template are selected using metadata from the music file as a seed; and
displaying the created digital cover artwork.

22. The device of claim 21, wherein, for a given content file and its associated metadata, performing the instructions on different computers creates the same digital artwork.

23. A non-transitory computer readable storage medium storing one or more programs, the one or more programs comprising instructions, which when executed by a device with a display, cause the device to:
determine if a music file has associated digital cover artwork;
if the music file does not have associated digital cover artwork, automatically create customized digital cover artwork for the music file based on album, title, and/or artist metadata associated with the music file, wherein creating the digital cover artwork includes:
  selecting a template based on genre metadata of the music file;
  inserting metadata associated with the music file into the template; and
  randomly modifying aspects of the template selected from the group comprising font type, font color, font size, capitalization, and/or background color, wherein the aspects of the template are selected using metadata from the music file as a seed; and
display the created digital cover artwork.

24. The computer readable storage medium of claim 23, wherein, for a given content file and its associated metadata, performing the instructions on different computers creates the same digital artwork.

25. An electronic device, comprising:
a display;
one or more processors;
memory; and
one or more programs, wherein the one or more programs are stored in the memory and configured to be executed by the one or more processors, the programs including instructions for:
determining, for each content file in a set of content files wherein a subset of the content files in the set of content files do not have associated digital artwork, whether the content file has associated digital artwork;
for each content file in the set of content files that does not have associated digital artwork, automatically creating customized digital artwork for the content file based on metadata associated with the content file, wherein creating the digital artwork includes:
  selecting a template based on genre metadata of the content file;
  inserting metadata associated with the content file into the template; and
  randomly modifying aspects of the template selected from the group comprising font type, font color, font size, capitalization, and/or background color, wherein the aspects of the template are selected using metadata from the content file as a seed; and
displaying the digital artwork for a plurality of content files in the set of content files.

26. The device of claim 25, wherein, for a given content file and its associated metadata, performing the instructions on different computers creates the same digital artwork.

27. A non-transitory computer readable storage medium storing one or more programs, the one or more programs comprising instructions, which when executed by a device with a display, cause the device to:
determine, for each content file in a set of content files wherein a subset of the content files in the set of content files do not have associated digital artwork, whether the content file has associated digital artwork;
for each content file in the set of content files that does not have associated digital artwork, automatically create customized digital artwork for the content file based on metadata associated with the content file, wherein creating the digital artwork includes:
  selecting a template based on genre metadata of the content file;
  inserting metadata associated with the content file into the template; and randomly modifying aspects of the template selected from the group comprising font type, font color, font size, capitalization, and/or background color, wherein the aspects of the template are selected using metadata from the content file as a seed; and display the digital artwork for a plurality of content files in the set of content files.

28. The computer readable storage medium of claim 27, wherein, for a given content file and its associated metadata, performing the instructions on different computers creates the same digital artwork.

\* \* \* \* \*